United States Patent
Pradeep et al.

(10) Patent No.: US 9,584,766 B2
(45) Date of Patent: Feb. 28, 2017

(54) INTEGRATED INTERACTIVE SPACE

(71) Applicant: Microsoft Technology Licensing, LLC, Redmond, WA (US)

(72) Inventors: Vivek Pradeep, Snohomish, WA (US); Stephen G. Latta, Seattle, WA (US); Steven Nabil Bathiche, Kirkland, WA (US); Kevin Geisner, Mercer Island, WA (US); Alice Jane Bernheim Brush, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/730,061

(22) Filed: Jun. 3, 2015

(65) Prior Publication Data

US 2015/0271449 A1   Sep. 24, 2015

Related U.S. Application Data

(63) Continuation of application No. 13/366,647, filed on Feb. 6, 2012, now Pat. No. 9,077,846.

(51) Int. Cl.
*H04N 7/14* (2006.01)
*H04N 7/15* (2006.01)

(52) U.S. Cl.
CPC ............. *H04N 7/157* (2013.01); *H04N 7/144* (2013.01)

(58) Field of Classification Search
CPC ........................................................ H04N 7/14
USPC ...................... 348/14.01, 14.03, 14.07, 14.08
See application file for complete search history.

(56) References Cited

U.S. PATENT DOCUMENTS

| 6,208,373 | B1 | 3/2001 | Fong et al. |
| 6,771,303 | B2 | 8/2004 | Zhang et al. |
| 7,515,174 | B1 | 4/2009 | Francisco et al. |
| 7,907,167 | B2 * | 3/2011 | Vesely ...................... G06T 3/00 345/1.1 |

(Continued)

OTHER PUBLICATIONS

Agamanolis, et al., "Reflection of Presence: Toward more natural and responsive telecollaboration," retrieved at <<http://citeseerx.ist.psu.edu/viewdoc/summary?doi=10.1.1.52.7139>>, Proceeding of SPIE Multimedia Networks, vol. 338, Nov. 1997, 9 Pages.*

(Continued)

*Primary Examiner* — Olisa Anwah
(74) *Attorney, Agent, or Firm* — Brandon Roper; Judy Yee; Micky Minhas

(57) ABSTRACT

Techniques for implementing an integrative interactive space are described. In implementations, video cameras that are positioned to capture video at different locations are synchronized such that aspects of the different locations can be used to generate an integrated interactive space. The integrated interactive space can enable users at the different locations to interact, such as via video interaction, audio interaction, and so on. In at least some embodiments, techniques can be implemented to adjust an image of a participant during a video session such that the participant appears to maintain eye contact with other video session participants at other locations. Techniques can also be implemented to provide a virtual shared space that can enable users to interact with the space, and can also enable users to interact with one another and/or objects that are displayed in the virtual shared space.

20 Claims, 18 Drawing Sheets

(56) References Cited

U.S. PATENT DOCUMENTS

| | | | |
|---|---|---|---|
| 8,644,467 B2 | 2/2014 | Catchpole | |
| 8,675,067 B2* | 3/2014 | Chou et al. | 348/143 |
| 9,077,846 B2 | 7/2015 | Pradeep et al. | |
| 2003/0067536 A1* | 4/2003 | Boulanger | H04N 7/15 348/14.08 |
| 2004/0196359 A1 | 10/2004 | Blackham | |
| 2007/0002130 A1 | 1/2007 | Hartkop | |
| 2008/0184124 A1 | 7/2008 | Agarwal et al. | |
| 2009/0033737 A1 | 2/2009 | Goose et al. | |
| 2009/0221368 A1* | 9/2009 | Yen | A63F 13/10 463/32 |
| 2009/0244257 A1 | 10/2009 | MacDonald et al. | |
| 2010/0245535 A1 | 9/2010 | Mauchly | |
| 2012/0162384 A1* | 6/2012 | Vesely | G06T 19/006 348/47 |
| 2012/0212509 A1* | 8/2012 | Benko | G03B 35/00 345/633 |
| 2012/0249741 A1* | 10/2012 | Maciocci | G06F 3/011 348/46 |
| 2012/0264510 A1* | 10/2012 | Wigdor | A63F 13/10 463/31 |
| 2013/0063538 A1 | 3/2013 | Hubner et al. | |
| 2013/0201276 A1 | 8/2013 | Pradeep | |
| 2014/0232816 A1* | 8/2014 | Wilson et al. | 348/14.08 |

OTHER PUBLICATIONS

"International Search Report and Written Opinion", Application No. PCT/US2013/024549, May 29, 2013, 12 pages.

"Non-Final Office Action", U.S. Appl. No. 13/366,647, May 15, 2014, 15 pages.

"Notice of Allowance", U.S. Appl. No. 13/366,647, Mar. 3, 2015, 12 pages.

"Restriction Requirement", U.S. Appl. No. 13/366,647, Sep. 15, 2014, 6 pages.

Kauff,"An Immersive 3D Video-Conferencing System Using Shared Virtual Team User Environments", Proceedings of the 4th international conference on Collaborative virtual environments, Sep. 30-Oct. 2, 2002, available at <http://citeseerx.ist.psu.edu/viewdoc/download;jsessionid=BCA9BE09F6294B5F3532AEBD7D8D6036?doi=10.1.1.91.7285&rep=rep1&type=pdf>, Sep. 30, 2002, 8 pages.

Schreer,"Here's Looking at You!—Eye-to-Eye Contact at Video Conferences", Fraunhofer Heinrich Hertz Institute, retrieved from <http://www.hhi.fraunhofer.de/fileadmin/hhi/Bilder/Events/cebit-2011/cc_press-release-videoconferencing-cebit2011-en.pdf> on Oct. 24, 2011, 1 page.

Tan,"ConnectBoard: Enabling Genuine Eye Contact and Accurate Gaze in Remote Collaboration", IEEE Transactions on Multimedia, available at <http://ieeexplore.ieee.org/stamp/stamp.jsp?tp=&arnumber=5737795>, Jun. 2011, pp. 466-473.

Vertegaal,"GAZE-2: Conveying Eye Contact in Group Video Conferencing Using Eye-Controlled Camera Direction", In Proceedings of CHI 2003, available at <http://citeseerx.ist.psu.edu/viewdoc/download;jsessionid=3A3C37BC13C23EEE806DF9839FC4499C?doi=10.1.1.95.7989&rep=rep1&type=pdf>, 2003, 8 pages.

* cited by examiner

INTEGRATED INTERACTIVE SPACE

RELATED APPLICATION

This application is a divisional of and claims priority to U.S. patent application Ser. No. 13/366,647 filed Feb. 6, 2012 titled Integrated Interactive Space, the disclosure of which is incorporated herewith in its entirety.

BACKGROUND

Advances in computing devices and data networks enable today's computer users to communicate with one another over great distances. Such communication includes text communication, audio communication, video communication, and so on. Various forms of communication can also be combined to provide a rich user experience. For example, conferencing techniques enable multiple users to communicate in real time using live video and audio. Current conferencing techniques suffer from a number of deficiencies, however. Among these deficiencies are limitations that affect the ability to render images of users in a way that simulates actual person to person interaction. Further, movement of a user during a conferencing session can cause difficulties in properly rendering an image of the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for implementing an integrative interactive space are described. In implementations, video cameras that are positioned to capture video at different locations are synchronized such that aspects of the different locations (such as scene geometry, user viewpoints and lighting) can be used to generate an integrated interactive space. The integrated interactive space can enable users at the different locations to interact, such as via video interaction, audio interaction, and so on.

In at least some embodiments, techniques can be implemented to adjust an image of a participant during a video session such that the participant appears to maintain eye contact with other video session participants at other locations.

Further to implementations, techniques can be implemented to provide a virtual shared space that can provide a medium for users at different locations to interact. For example, the virtual shared space can provide a common interactive view for users at different locations, such as a whiteboard that users at different locations can view and interact with. The virtual shared space can be implemented in a visually three-dimensional environment that can not only enable users to interact with the space, but can also enable users to interact with one another and/or objects that are displayed in the visual three-dimensional environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
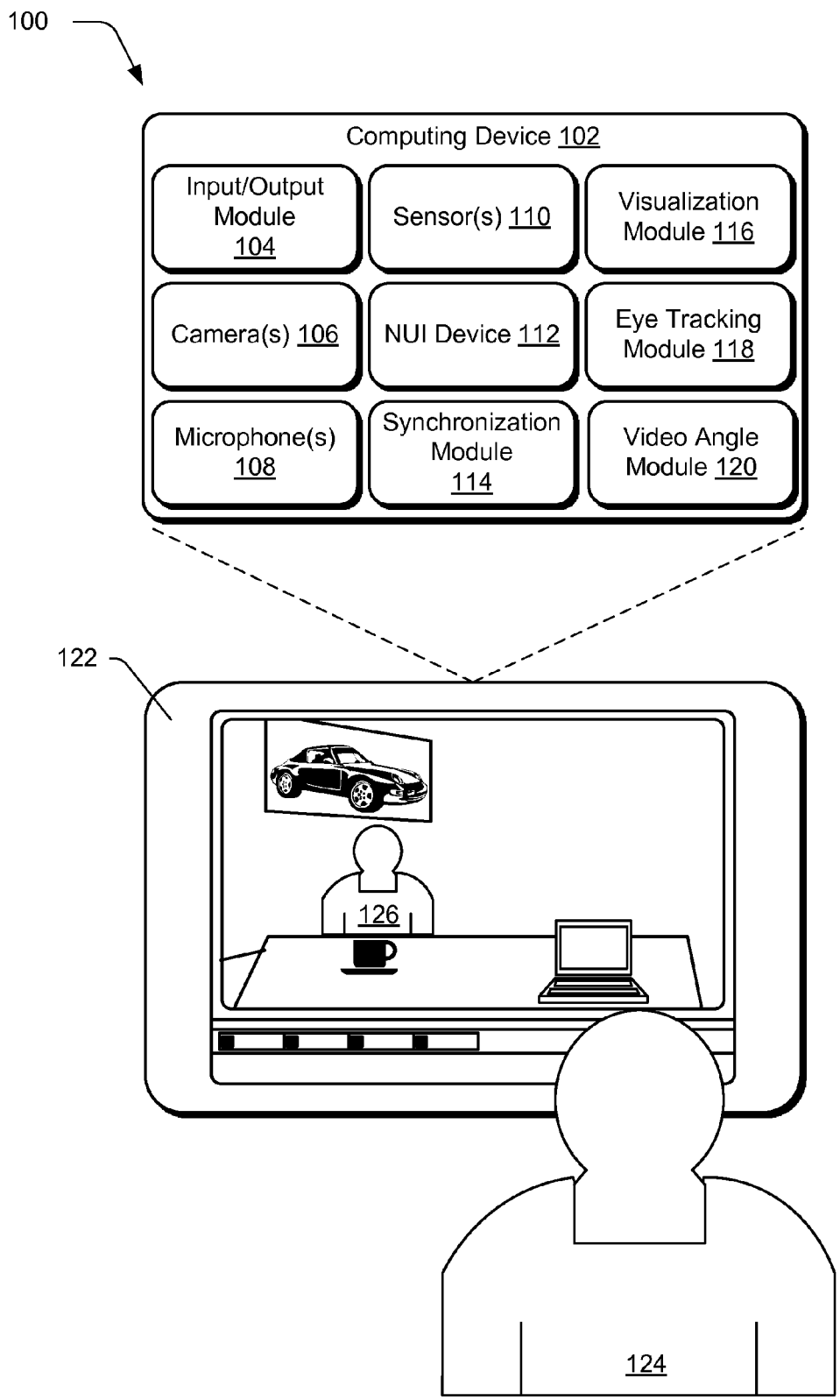
FIG. 1 is an illustration of an environment in an example implementation that is operable to employ techniques discussed herein.

Techniques for implementing an integrative interactive space are described. In implementations, video cameras that are positioned to capture video at different locations are synchronized such that aspects of the different locations can be used to generate an integrated interactive space. For example, consider a scenario where two individuals that are each in different rooms at different geographic locations wish to participate in an interactive video session. The interactive video session can be for purposes of a business meeting, educational instruction, social interaction, and so on.

To facilitate the interactive video session, cameras are positioned in each of the different rooms such that the cameras can capture video images of various aspects of the different rooms. For example, a first camera can capture a view of a first room at which a first individual is present, and a second camera can capture a view of a second room at which a second individual is present. Techniques discussed herein enable the first camera and the second camera to be synchronized, such as using a common coordinate system in three dimensions. In implementations, synchronizing the cameras enables the views of the first room and the second room to be combined into an integrated interactive space in which individuals can interact, such as via video interaction, audio interaction, and so on.

In at least some embodiments, techniques can be implemented to adjust an image of a participant during a video session such that the participant appears to maintain eye contact with other video session participants at other locations. For example, consider a scenario where a student at one location is participating in an educational video session hosted by a teacher at another location. Techniques discussed herein can enable an image of the teacher's face to be adjusted such that the teacher appears to gaze out of the student's video screen and at the student, for example, simulating eye contact between the teacher and the student. Techniques can further enable such simulated eye contact to be maintained, even if the teacher is not staring directly into a camera. For example, if the teacher moves around the room while lecturing to a student and/or asking a student a question, an image of the teacher's face on the student's video screen can be adjusted such that the teacher appears to maintain eye contact with the student. In implementations, the simulated eye contact can be maintained even if the student's video screen is not angled for direct viewing by the student, such as when the student's video screen is not normal (e.g., perpendicular) to the student's gaze.

Further to implementations, techniques can be implemented to provide a virtual shared space that can provide a medium for users at different locations to interact. For example, the virtual shared space can provide a common interactive view for users at different locations, such as a whiteboard that users at different locations can view and interact with. The virtual shared space can be implemented in a visually three-dimensional environment that can not only enable users to interact with the space, but can also enable users to interact with one another and/or objects that are displayed in the visual three-dimensional environment.

For example, a visual rendering of an object (e.g., a virtual object) can be visually manipulated by a user in the virtual shared space. For instance, the virtual object can appear to be held in a displayed version of the user's hand. The virtual object can also be passed from one user to another in the virtual shared space. For example, a displayed version of a user's hand can pass the virtual object to a displayed version of a different user's hand in the virtual shared space, even if the different user is in a different geographic location.

In the following discussion, an example environment is first described that is operable to employ techniques described herein. Next, a section entitled "Integrated Interactive Space" describes some example implementations of an integrated interactive space in accordance with one or more embodiments. Following this, a section entitled "Eye Tracking for Virtual Point of View" describes example implementations for eye tracking in accordance with one or more embodiments. Next, a section entitled "Virtual Shared Space" describes some example implementations of a virtual shared space in accordance with one or more embodiments. Finally, an example system and device are described that are operable to employ techniques discussed herein in accordance with one or more embodiments.

Example Environment

FIG. 1 is an illustration of an environment 100 in an example implementation that is operable to implement techniques discussed herein. The illustrated environment 100 includes a computing device 102, which may be configured in a variety of ways. For example, although the computing device 102 is illustrated as a mobile communication device (e.g., tablet, wireless telephone), the computing device 102 may be configured in a variety of other ways. For instance, the computing device 102 may be configured as a computer that is capable of communicating over a network, such as a desktop computer, a mobile station, an entertainment appliance, a set-top box communicatively coupled to a display device, a game console, and so forth.

Accordingly, the computing device 102 may range from full resource devices with substantial memory and processor resources (e.g., personal computers, game consoles) to low-resource devices with limited memory and/or processing resources (e.g., traditional set-top boxes, hand-held game consoles). Additionally, although a single computing device 102 is shown, the computing device 102 may be representative of a plurality of different devices, such as a user-wearable helmet and game console, multiple servers utilized by a business to perform operations that provide a platform "in the cloud," a remote control and set-top box combination, and so on. One of a variety of different examples of a computing device 102 is shown and described below in FIGS. 17 and 18.

Included as part of the computing device 102 is an input/output module 104 that represents functionality for sending and receiving information. For example, the input/output module 104 can be configured to receive input generated by an input device, such as a keyboard, a mouse, a touchpad, a game controller, an optical scanner, and so on. The input/output module 104 can also be configured to receive and/or interpret input received via a touchless mechanism, such as via voice recognition, gesture-based input, object scanning, and so on.

Further included as part of the computing device 102 are a variety of input devices, such as one or more cameras 106, one or more microphones 108, one or more sensors 110, and a natural user interface (NUI) device 112. The cameras 106 can include a variety of different devices that are configured to capture video data, such as two-dimensional video data, three-dimensional video data, and so on. The sensors 110 can include devices that are configured to detect a variety of different phenomenon, such as a radio-frequency identification (RFID) sensor, an infrared (IR) sensor, a light and/or color sensor, a biosensor, and so. The sensors 110 can also include and/or be associated with functionality to interpret such phenomena and convert aspects of detected phenomena into a form (e.g., digital data) that can be utilized by the input/output module 104.

The NUI device 112 is configured to receive a variety of touchless input, such as via visual recognition of human gestures, object scanning, voice recognition, color recognition, and so on. In at least some embodiments, the NUI device 112 is configured to recognize gestures, objects, images, and so on, via input received from the cameras 106. An example camera 106, for instance, can be configured with lenses, light sources, and/or light sensors such that a variety of different phenomena can be observed and captured as input. For example, the camera 106 can be configured to sense movement in a variety of dimensions, such as vertical movement, horizontal movement, and forward and backward movement, e.g., relative to the camera 106. Thus, in at least some embodiments the NUI device 112 can leverage the camera 106 to capture information about image composition, movement, and/or position. The input/output module 104 can utilize this information to perform a variety of different tasks according to techniques discussed herein.

The computing device 102 further includes a synchronization (sync) module 114, which is representative of functionality to implement various sync operations as part of techniques discussed herein. For example, the sync module 114 can receive sync information from the cameras 106, as well as from one or more cameras that are remote from the computing device 102. The sync module 114 can utilize the sync information to generate a common reference system for video data from the different cameras, as discussed in more detail elsewhere herein.

Further included as part of the computing device 102 is a visualization module 116, which is representative of functionality to generate visual environments according to various techniques discussed herein. For example, the visualization module 116 can receive video data from the cameras 106 and from one or more cameras that are remote from the computing device 102. The visualization module 116 can apply a common reference system generated by the sync module 114 to the video data to generate an integrated interactive environment in which users can interact. In implementations, the visualization module 116 can include and/or make use of hardware (e.g., display projectors) arranged strategically to generate the integrated interactive spaces and virtual objects.

The computing device 102 further includes an eye tracking module 118, which is representative of functionality to track eye gaze direction for a user. For example, the eye tracking module 118 can leverage the camera 106 and/or the NUI device 112 to receive information that corresponds to a user's gaze, e.g., the actual gaze direction of a user. The eye tracking module 118 can provide this information to the visualization module 116, which can use this information to adjust a visual display of a user such that the user appears to maintain eye contact with another user who is viewing the display. Further aspects of such embodiments are discussed in more detail below.

The computing device 102 is further illustrated as including a video angle module 120, which is representative of functionality to adjust various visual aspects of displayed objects based on an angle of a video display. For example, a display screen 122 included as part of the computing device 102 can be physically positioned at different angles relative to a user 124 that is viewing the display screen. To compensate for these different viewing angles, the video angle module 120 can adjust visual aspects of objects that are displayed on the display screen 122 to enable the user 124 to maintain an optimal view of the displayed objects. For instance, consider a scenario where the display screen 122 is positioned at an angle where the user 124 is not staring directly at the display screen 122, e.g., the viewing angle of the user 124 is not perpendicular to the surface of the display screen 122. In such a scenario, the video angle module 120 can adjust a gaze angle of an image of a remote user 126 displayed on the display screen 122 such that the remote user 126 appears to maintain eye contact with the user 124. Further aspects and implementations of the environment 100 are discussed in more detail below.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or GPUs). The program code can be stored in one or more computer readable memory devices. The features of the techniques described below are platform-independent, meaning that the techniques may be implemented on a variety of commercial computing platforms having a variety of processors.

For example, the computing device 102 may also include an entity (e.g., software) that causes hardware of the computing device 102 to perform operations, e.g., processors, functional blocks, and so on. For example, the computing device 102 may include a computer-readable medium that may be configured to maintain instructions that cause the computing device, and more particularly hardware of the computing device 102 to perform operations. Thus, the instructions function to configure the hardware to perform the operations and in this way result in transformation of the hardware to perform functions. The instructions may be provided by the computer-readable medium to the computing device 102 through a variety of different configurations.

One such configuration of a computer-readable medium is signal bearing medium and thus is configured to transmit the instructions (e.g., as a carrier wave) to the hardware of the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Discussed below are a number of methods that may be implemented to perform techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Integrated Interactive Space

As referenced above, techniques discussed herein can be implemented to generate an integrated interactive space that can enable users at different locations to interact with one another. For example, consider the following implementation scenarios in accordance with one or more embodiments.

Figure 2:
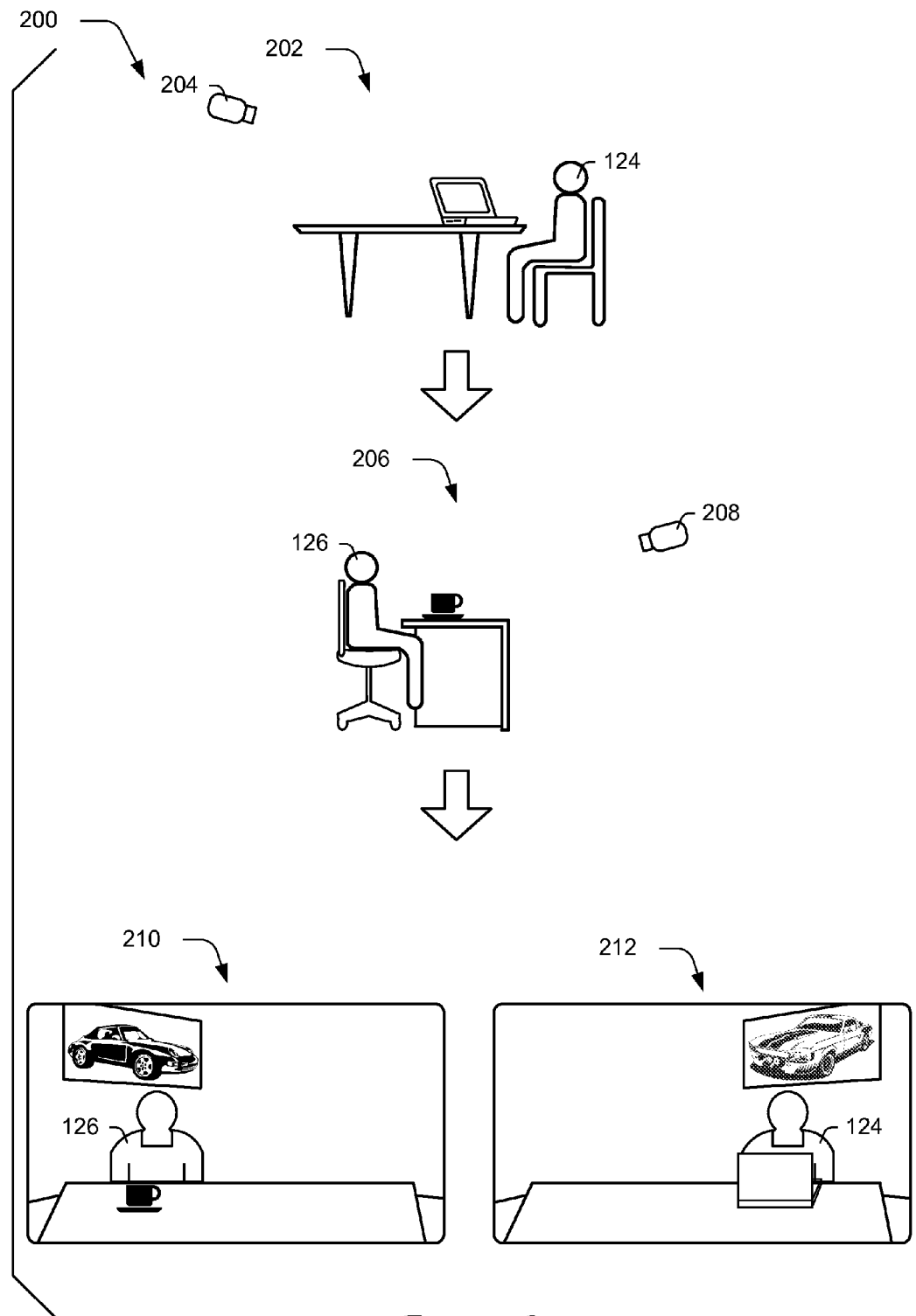
FIG. 2 illustrates an example implementation scenario in accordance with one or more embodiments.

FIG. 2 illustrates an example implementation scenario 200 in which an integrated interactive space is generated that allows two users who are each at different locations to interact with each other. Starting with the upper portion of the scenario 200, the user 124 is illustrated at a location 202. Positioned within the location 202 is a camera 204. The camera 204 is positioned to capture a front view of the user 124, such as a facing view of the user 124 from the perspective of another user.

Proceeding to the center portion of the scenario 200, the user 126 is illustrated at a location 206. Positioned within the location 206 is a camera 208. The camera 208 is positioned to capture a front view of the user 126, such as a facing view of the user 126 from the perspective of another user.

Continuing on to the bottom portion of the scenario 200, video data captured by the cameras positioned at the locations 202, 206 is processed and combined according to techniques discussed herein to generate an integrated interactive space in which the users 124, 126 can interact. Illustrated in the bottom portion of the scenario 200 are an interactive view 210 and an interactive view 212, which represent different views of the integrated interactive space generated using the captured video data.

The interactive view 210 represents a view of the integrated interactive space from the perspective of the user 124, and includes video data from the camera 208. For example, the interactive view 210 provides a facing view of the user 126, as well as portions of the location 206 that surround the user 126. Thus, the interactive view 210 can display an image of the user 126 and surrounding portions of the location 206 such as would appear to another user who is facing the user 126 in the location 206.

The interactive view 212 represents a view of the integrated interactive space from the perspective of the user 126, and includes video data from the camera 204. For instance, the interactive view 212 can display a facing view of the user 124 and portions of the location 202 that surround the user 124. For example, the interactive view 212 can display an image of the user 124 and surrounding portions of the location 202 such as would appear to another user facing the user 124.

In implementations, the interactive views 210, 212 can include live video feeds from their respective locations which can be displayed to users at other locations. Thus, the interactive views 210, 212 can provide a visual portal for different users into the integrated interactive space generated using video data from the cameras 204, 208.

Figure 3:
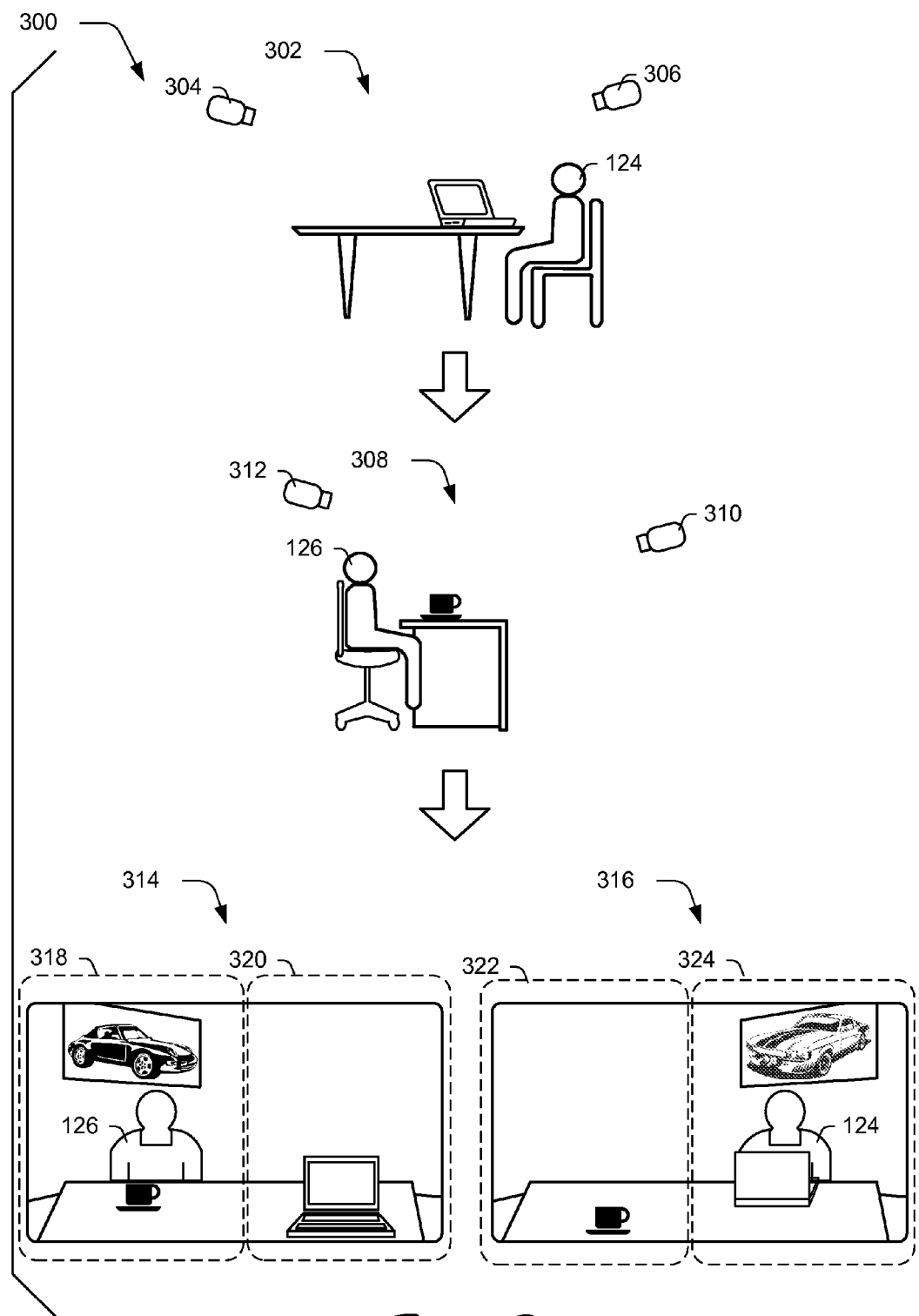
FIG. 3 illustrates an example implementation scenario in accordance with one or more embodiments.

FIG. 3 illustrates another example implementation scenario 300 in which an integrated interactive space is generated that allows multiple users who are each at different locations to interact with each other. Starting with the upper portion of the scenario 300, the user 124 is illustrated at a location 302. Positioned within the location 302 are a camera 304 and a camera 306. The camera 304 is positioned to capture a front view of the user 124, such as a facing view of the user 124 from the perspective of another user. The camera 306 is positioned to capture various objects within the location 302, such as simulating a visual perspective of the user 124.

Proceeding to the center portion of the scenario 300, the user 126 is illustrated at a location 308. Positioned within the location 308 are a camera 310 and a camera 312. The camera 310 is positioned to capture a front view of the user 126, such as a facing view of the user 126 from the perspective of another user. The camera 312 is positioned to capture various objects within the location 308, such as simulating a visual perspective of the user 126.

Continuing on to the bottom portion of the scenario 300, video data captured by the cameras positioned at the locations 302, 308 is processed and combined according to techniques discussed herein to generate an integrated interactive space in which the users 124, 126 can interact. Illustrated in the bottom portion of the scenario 300 are an interactive view 314 and an interactive view 316, which represent different views of the integrated interactive space generated using the captured video data.

The interactive view 314 represents a view of the integrated interactive space from the perspective of the user 124, and includes a view portion 318 and a view portion 320 that are combined to form the interactive view 314. The view portion 318 includes video data from the camera 310, and provides a facing view of the user 126 as well as portions of the location 308 that surround the user 126. For example, the view portion 318 can display an image of the user 126 and surrounding portions of the location 308 such as would appear to another user who is facing the user 126 in the location 308.

The view portion 320 includes video data from the camera 306, and can provide a visual perspective of the location 302 that simulates the visual perspective of the user 124 and/or another user who is viewing the integrated interactive space. For example, the view portion 320 can display objects and attributes of the location 302 that the user 124 views from their position within the location 302. In implementations, the view portions 318, 320 can include live video feeds from their respective locations which can be displayed adjacent to one another in various positional configurations.

Thus, the interactive view 314 combines visual images of the locations 302, 308 and provides a visual portal for the user 124 and/or other users into the integrated interactive space generated using video data from the two locations. For example, the interactive view 314 can be viewed by other users besides the users 124, 126 to provide an appearance that the users 124, 126 are together at a single location.

The interactive view 316 represents a view of the integrated interactive space from the perspective of the user 126, and includes a view portion 322 and a view portion 324 that are combined to form the interactive view 316. The view portion 322 includes video data from the camera 312, and can provide a visual perspective of the location 308 that simulates the visual perspective of the user 126. For example, the view portion 322 can display objects and attributes of the location 308 that the user 126 views from their position within the location 208.

The view portion 324 includes video data from the camera 304, and provides a facing view of the user 124. For example, the view portion 324 can display an image of the user 124 such as the user 124 would appear when facing the user 126 and/or another user. In implementations, the view portions 322, 324 can include live video feeds from their respective locations which can be displayed adjacent to one another in various positional configurations. Thus, the interactive view 316 combines visual images of the locations 302, 308 and provides a visual portal for the user 126 and/or other users into the integrated interactive space generated using video data from the two locations. For example, the interactive view 316 can be viewed by other users besides the users 124, 126 to provide an appearance that the users 124, 126 are together at a single location.

Figure 4:
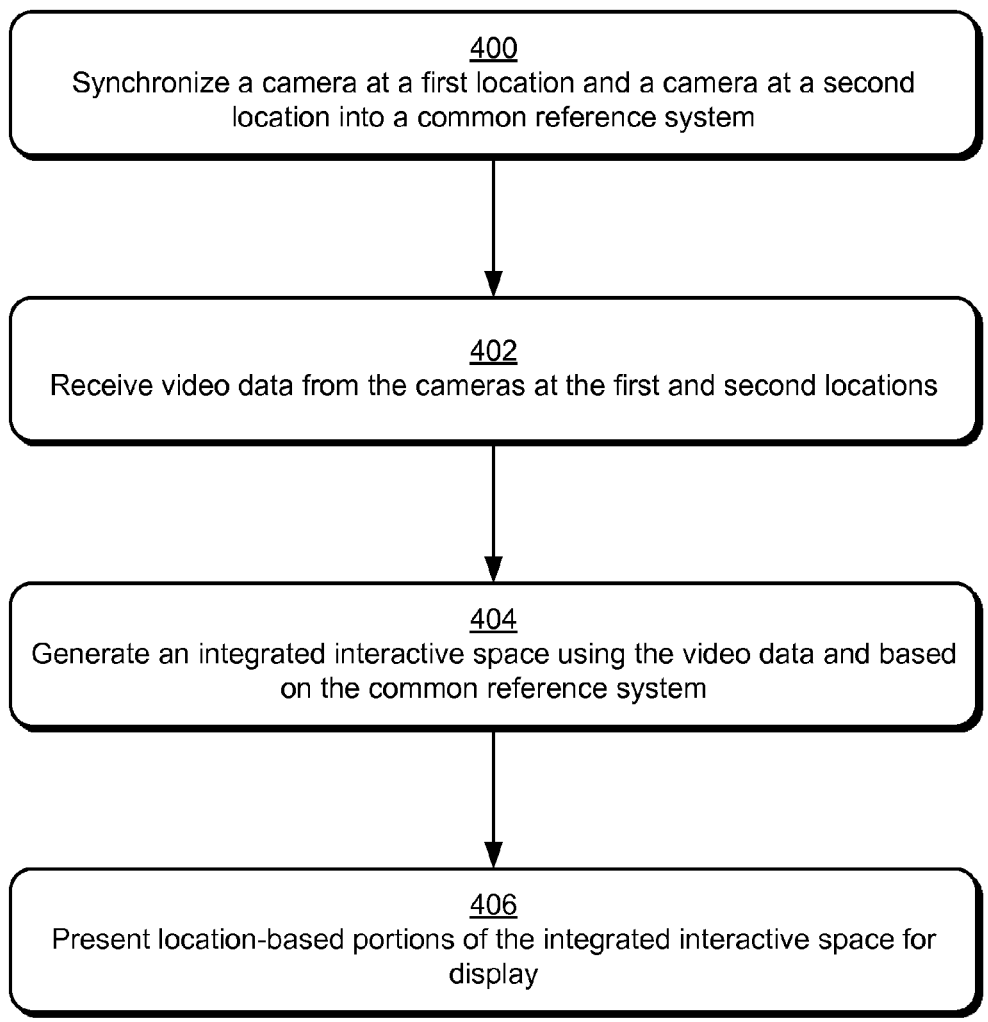
FIG. 4 is a flow diagram that describes steps in a method in accordance with one or more embodiments.

FIG. 4 is a flow diagram that describes steps in a method in accordance with one or more embodiments. Step 400 synchronizes a camera at a first location and a camera at a second location into a common reference system. For example, the cameras can be registered together into a common three-dimensional coordinate system such that video data from the cameras can be rendered appropriately to the end users. Further details concerning camera and video data synchronization are presented below.

Step 402 receives video data from the cameras at the first and second locations. In implementations, the video data can be received at a client device and/or a network service that is configured to receive and process the video data. Step 404 generates an integrated interactive space using the video data and based on the common reference system. For example, visual locations included in the video data can be correlated to positions within the common reference system based on which camera captured the video data and the camera's position in the common reference system.

Step 406 presents location-based portions of the integrated interactive space for display. For example, which portion of the integrated interactive space is displayed can depend on a location in which the integrated interactive space is being viewed. This notion is discussed above with reference to FIGS. 2 and 3, as well as in the discussion below.

Figure 5:
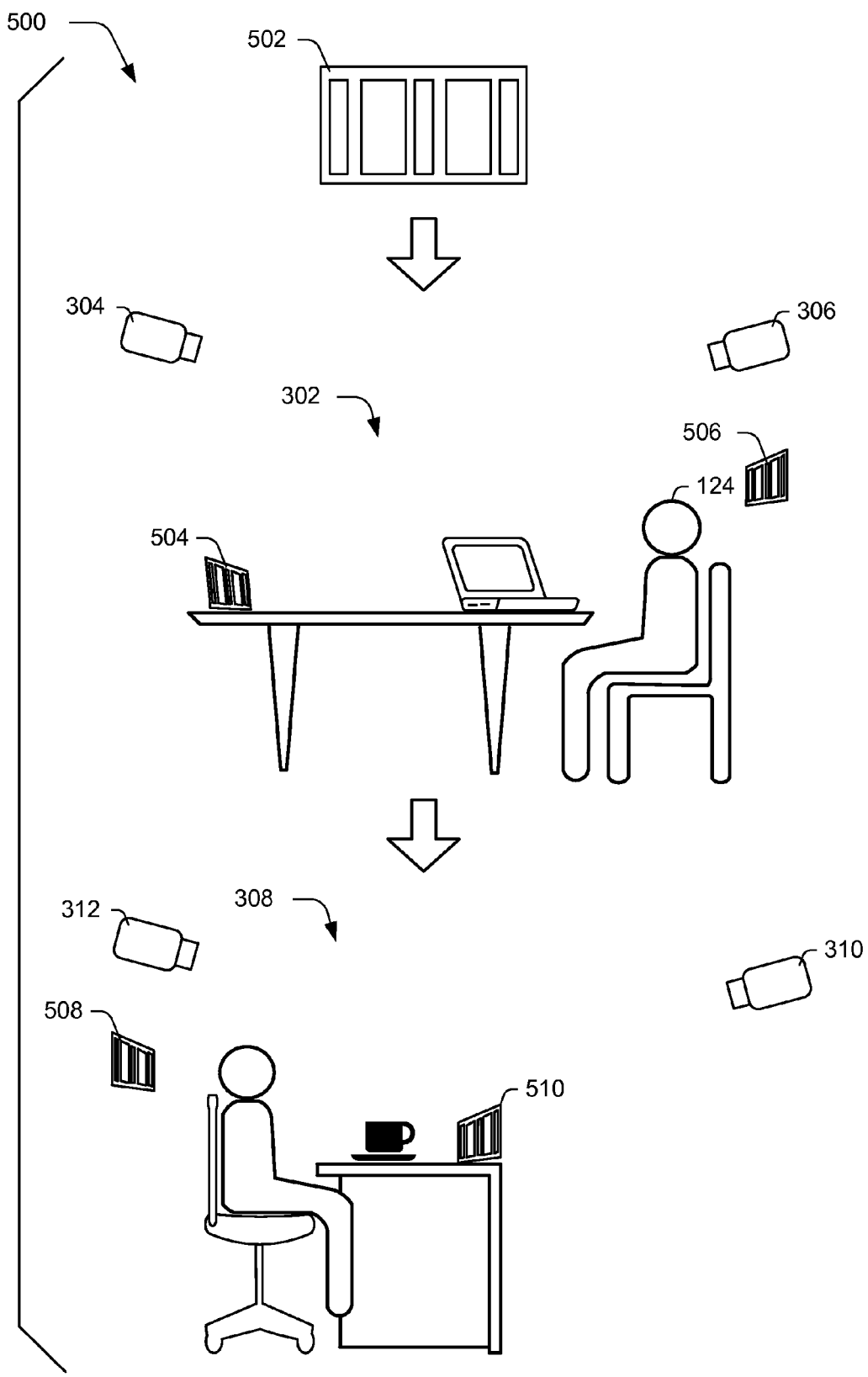
FIG. 5 illustrates an example implementation scenario in accordance with one or more embodiments.

FIG. 5 illustrates an example implementation scenario 500 in which cameras positioned at different locations are synchronized to a common reference system. Starting with the upper portion of the scenario 500, a fiducial marker 502 is illustrated. In implementations, the fiducial marker 502 is an object that can be placed in various locations and can serve as a visual reference point within the locations. In this example, the fiducial marker 502 is illustrated as a portion of material (e.g., paper, cardboard, and so on) of known size, e.g., known length and width. Printed on the fiducial marker 502 are a number of markings of known size and orientation, such as length, width, and angle with reference to the edges of the fiducial marker 502. One example of the fiducial marker 502 is a barcode printed on a piece of material. The fiducial marker 502 is presented for purposes of example only, and it is contemplated that a wide variety of different objects and/or visual indicia may be used as fiducial markers within the spirit and scope of the claimed embodiments.

Proceeding to the center portion of the scenario 500, the location 302 (introduced above) is illustrated as including a fiducial instance 504 of the fiducial marker 502, and a fiducial instance 506 of the fiducial marker 502. In implementations, the fiducial instances 504, 506 are duplicates of the fiducial marker 502 and have identical dimensions and markings as the fiducial marker 502.

Further to the scenario 500, the fiducial instances 504, 506 are positioned in specific locations within the location 302. For example, the fiducial instance 504 is positioned on a table in front of the user 124 and in view of the camera 306. Further, the fiducial instance 506 is positioned behind the user 124 (e.g., affixed to a wall behind the user) and in view of the camera 304.

To determine a position and/or orientation (e.g., "pose") of the camera 304 in the location 302, the camera 304 can capture an image of the fiducial instance 506. The relative dimensions and orientations of the various attributes of the fiducial instance 506 can be determined from the captured image of the fiducial instance 506, e.g., with reference to other objects in the field of view of the camera 304. The relative dimensions and orientations of the various attributes can be compared to the actual dimensions and orientations of these various attributes to determine the position and/or orientation of the camera 304 in the location 302. For example, the position and/or orientation of the camera 304 can specify how a lens or other capture device of the camera 304 is positioned relative to the fiducial instance 506.

Using a similar process as described above for the camera 304, the position and/or orientation of the camera 306 can be determined utilizing the fiducial instance 504. Thus, the video data captured by the cameras 304, 306 of the respective fiducial instances can be used to determine coordinate transformations between the cameras and to generate a three-dimensional model of the location 302.

Continuing to the bottom portion of the scenario 500, the location 308 (introduced above) is illustrated as including a fiducial instance 508 of the fiducial marker 502, and a fiducial instance 510 of the fiducial marker 502. In implementations, the fiducial instances 508, 510 are duplicates of the fiducial marker 502 and have identical dimensions and markings as the fiducial marker 502. Using a similar process as described above for the camera 304, the position and/or orientation of the camera 310 can be determined utilizing the fiducial instance 508, and the position and/or orientation of the camera 312 can be determined utilizing the fiducial instance 510. Thus, the video data captured by the cameras 310, 312 of the respective fiducial instances can be used to determine coordinate transformations between the cameras and to generate a three-dimensional model of the location 308.

Further to the scenario 500, consider an example implementation where the location 302 is a 'host' for an integrated interactive environment, and the location 308 is a 'client' for the integrated interactive environment. In such an example implementation, fiducial interest points from the fiducial instance 510 as observed by camera 312 are transferred to the sync module 114 at the location 302. The sync module 114 compares fiducial interest points determined by the camera 304 from the fiducial instance 506 with those of the fiducial instance 510 received from camera 312, and establishes relationships between corresponding fiducial interest points on the fiducial instances. Using these relationships, the sync module 114 can estimate the orientation of the camera 312 relative to the fiducial instance 506. Thus, orientation transformation information between the locations 302, 308 can be derived from the orientation relationship of cameras 304, 312.

Further to the scenario 500, size scale for the locations can be determined based on captured attributes of the fiducial instances. The size scale can be adjusted manually and/or using computer vision heuristics, such as applied to known dimension information for the respective locations.

Using the determined orientation relationships between the cameras 304, 312, and the size scale information for the respective locations, an integrated interactive space can be generate using video data from the cameras. Using similar techniques, relationships between the cameras (304, 310), (312, 306), and (306, 310) can be derived to augment the integrated interactive space, to generate other integrated interactive spaces, to improve the accuracy of the techniques, to render larger fields of view as part of the integrated interactive space, and so on.

In implementations, the position and orientation information determined for the cameras in the different locations (e.g., using the corresponding fiducial instances) can be used to register portions of the different locations captured by the cameras into in integrated three-dimensional point cloud. The integrated three-dimensional point cloud can then be used to generate integrated interactive spaces, as well as to implement other techniques discussed herein.

While the scenario 500 is discussed with reference to more than one fiducial instance in a particular location, this is not to be construed as limiting on the claimed subject matter. For example, in implementations a single fiducial instance can be used at a particular location to synchronize one or more cameras at the particular location with one or more cameras at another location. For instance, consider the location 302. If the cameras 304, 306 have overlapping viewpoints, then a coordinate transformation between them can be determined using a single fiducial instance that is in view of both cameras, e.g., using techniques discussed herein for camera synchronization. Additionally or alternatively, interest points of the location 302 (e.g., other than a fiducial instance) that exist in an overlapping viewpoint of the cameras 304, 306 can be matched in the images of cameras 304, 306.

Figure 6:
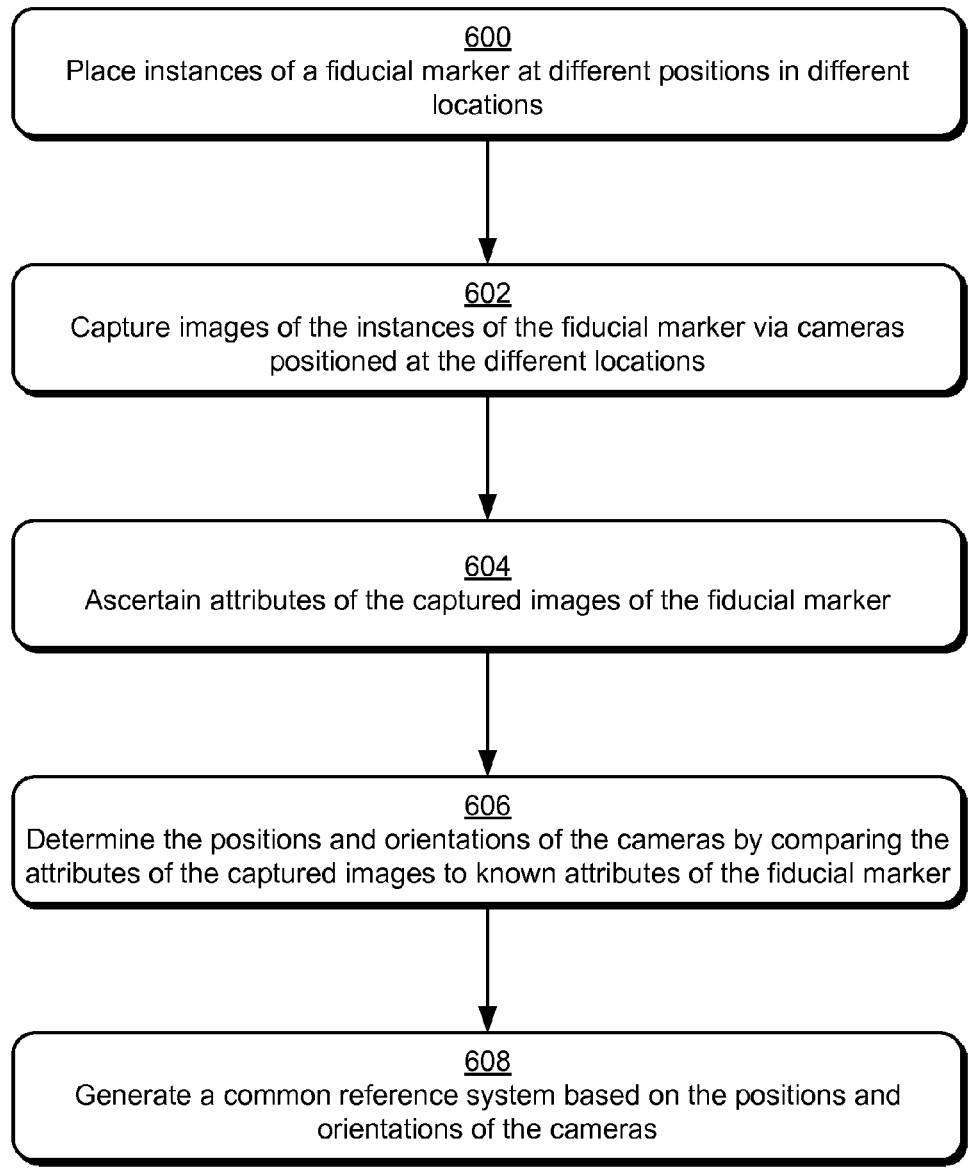
FIG. 6 is a flow diagram that describes steps in a method in accordance with one or more embodiments.

FIG. 6 is a flow diagram that describes steps in a method in accordance with one or more embodiments. In at least some embodiments, the method provides an example implementation of step 400, discussed above with reference to FIG. 4.

Step 600 places instances of a fiducial marker at different positions in different locations. As discussed above, a fiducial marker can be a two-dimensional object with known dimensions that includes markings and/or other indicia of known orientations and dimensions. A wide variety of other objects and/or indicia may also be used as a fiducial marker. For example, a three-dimensional object that can be placed in various positions in a location can be used as a fiducial marker. A fiducial marker can also include pre-existing aspects of a particular location whose dimensions are known or may be determined, such as an air vent in a room, a white board on the wall, a light fixture, and so.

As yet a further example, displayed images may also be used as a fiducial marker. For instance, an image may be displayed on a display screen (e.g., of the computing device 102) at a particular location. The dimensions of the image, as well as the dimensions and/or orientations of aspects of the image can be known. Further, attributes of the display screen on which image is displayed can also be known, such as the dimensions of the display area, the resolution, the screen angle, and so on. Based on the known attributes of the displayed image and display screen, the displayed image can be used as a fiducial marker according techniques discussed herein.

Step 602 captures images of the instances of the fiducial marker via cameras positioned at the different locations. Step 604 ascertains attributes of the captured images of the fiducial marker. For example, relative sizes of the fiducial marker in the captured images can be determined, as well as relative angles and/or positions of features of the fiducial marker.

Step 606 determines the positions and orientations of the cameras by comparing the attributes of the captured images to known attributes of the fiducial marker. As discussed above, the dimensions of the fiducial marker can be known, as well as the dimensions and/or orientations of markings or other features of the fiducial marker. Step 608 generates a common reference system based on the positions and orientations of the cameras. For example, a three-dimensional point cloud can be generated, and images captured by the cameras can be used to populate the three-dimensional point cloud based on the positions and orientations of the cameras. The common reference system can then be used implement various techniques discussed herein, such as generating an integrated interactive space.

Eye Tracking for Virtual Point of View

As referenced above, techniques discussed herein can be implemented to adjust an image of a user who is participating in a video session such that the user appears to maintain eye contact with other users who are also participating in the video session. For example, consider the following implementation scenario in accordance with one or more embodiments.

Figure 7:
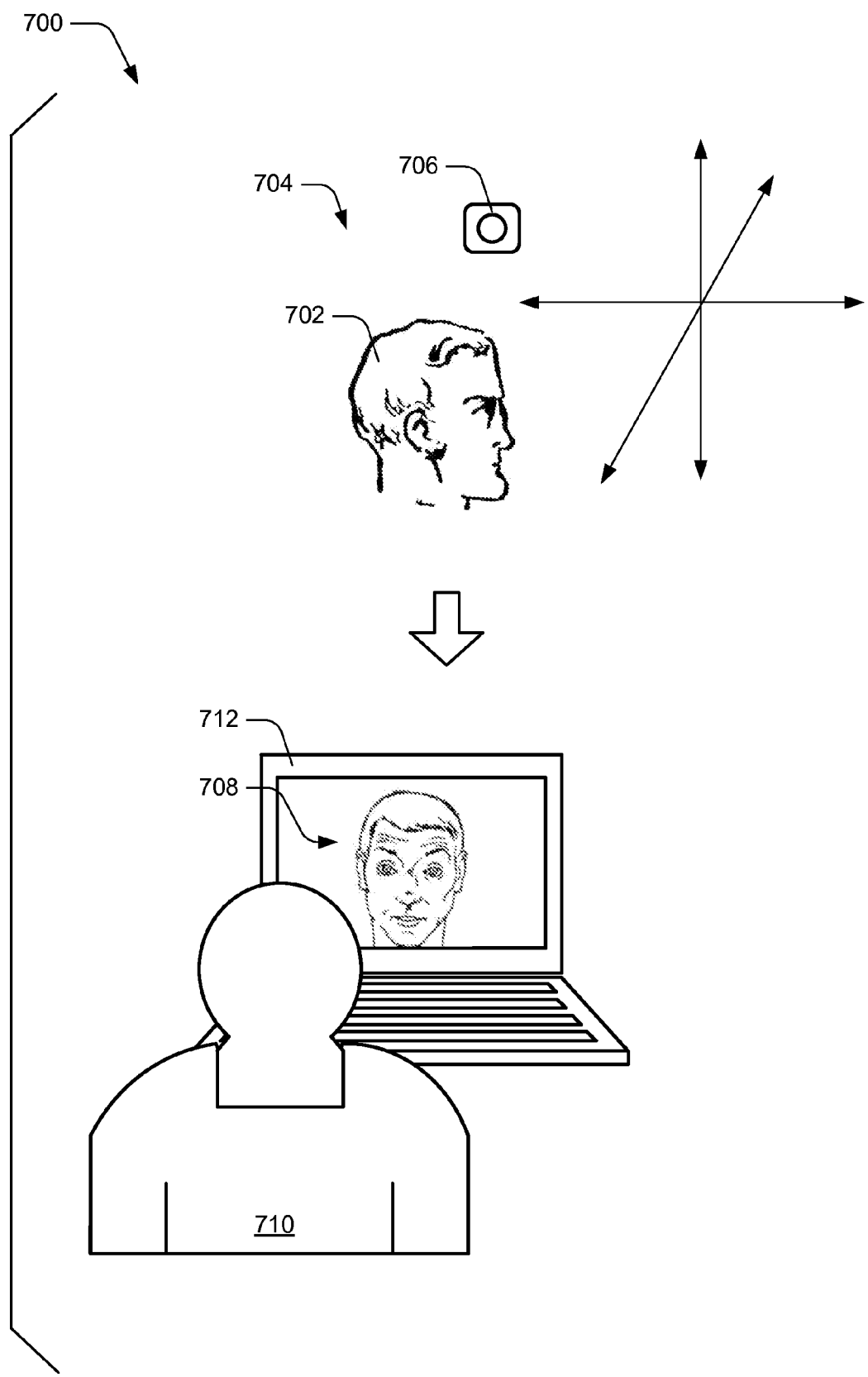
FIG. 7 illustrates an example implementation scenario in accordance with one or more embodiments.

FIG. 7 illustrates an example implementation scenario 700 in which an image of an individual 702 is adjusted such that the individual 702 appears to maintain eye contact with other individuals who are viewing the image. Starting with the upper portion of the scenario 700, the individual 702 is physically present at a location 704. Positioned at the location 704 is a camera 706. In implementations, the camera 706 can capture images of the individual 702 and other aspects of the location 704. The images can be used to generate an integrated interactive space according to various techniques discussed herein.

Further to the scenario 700, the individual 702 is positioned relative to the camera 706 such that the camera 706 captures a profile view of the individual. Thus, raw video data from the camera 706 would display a profile view of the individual 702. In implementations, the profile view of the individual 702 can be captured while the individual is in motion at the location 704. For example, the individual 702 can be an instructor who is lecturing in a classroom.

Continuing to the bottom portion of the scenario 700, an image 708 of the individual 702 is adjusted such that the individual appears to be making eye contact with an individual 710 who is viewing the image 708 via a device 712. Thus, even though the camera 706 is capturing a profile view (e.g., side view) of the individual 702, the image 708 is adjusted such that it appears that the camera 706 is capturing a facing view of the individual 702.

In implementations, portions of video data that is used to generate the image 708 can be captured as discussed in the upper portion of the scenario 700. For example, portions of the video data can include the profile view of the individual 702 captured via the camera 706. Other portions of video data used to generate the image 708 can be extrapolated from video data captured by the camera 706, e.g., using three-dimensional computer modeling techniques. Additionally or alternatively, the other portions of video data used to generate the image 708 can be extracted from other sources, such as previously-captured images of the individual 702.

While the scenario 700 is discussed with reference to adjusting the image 708 to compensate for a position of the individual 702 with respect to the camera 706, at least some implementations can be employed to adjust the image 708 based on a view angle of the individual 710 with respect to the device 712. For example, an angle at which the individual 710 is viewing the image 708 on the device 712 can be determined, such as using body pose and/or eye tracking techniques. For instance, a camera included as part of the device 712 and/or positioned in view of the individual 710 can capture images and/or position information about the individual 710. This information can be used to adjust the image 708 based on the viewing angle of the individual 710 such that the individual 702 appears to maintain eye contact with the individual 710. Thus, if the individual 710 moves to a different location relative to the device 712 (e.g., towards one side or another, up or down, and so on), the image 708 can be adjusted accordingly to maintain to appearance of eye contact between the individuals.

Figure 8:
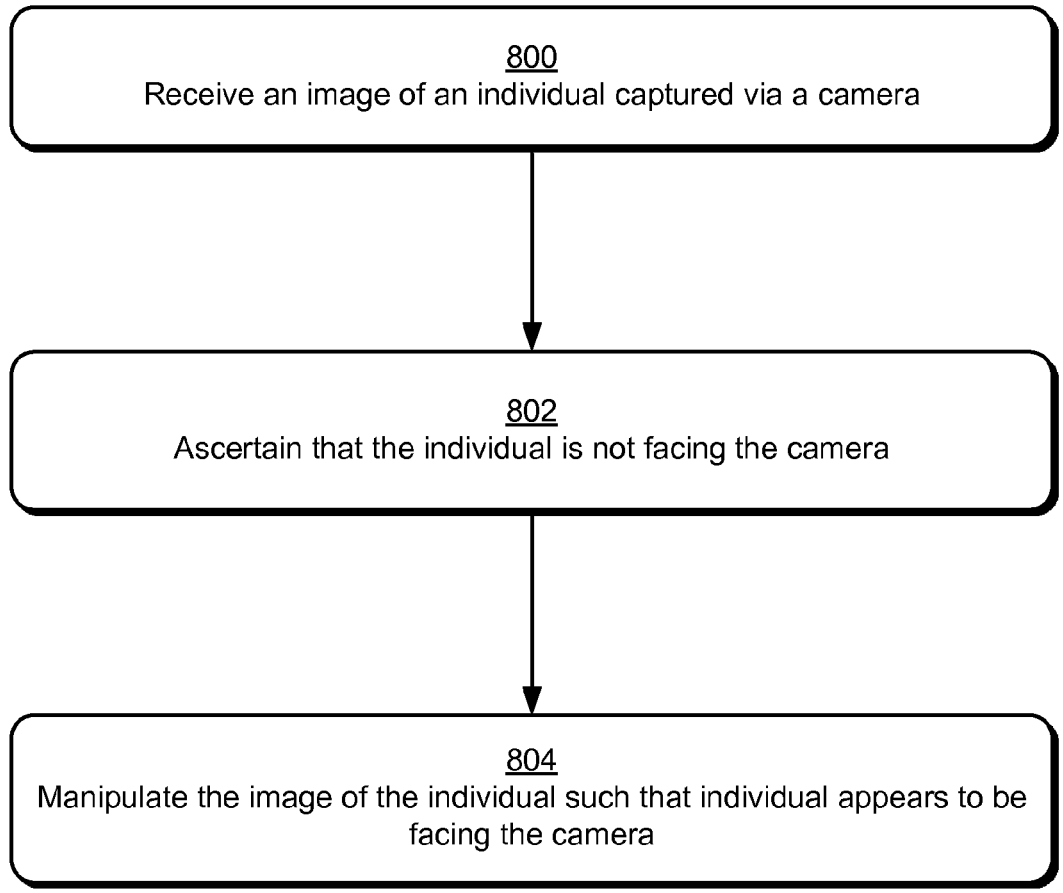
FIG. 8 is a flow diagram that describes steps in a method in accordance with one or more embodiments.

FIG. 8 is a flow diagram that describes steps in a method in accordance with one or more embodiments. Step 800 receives an image of an individual captured via a camera. For example, the image of the individual can be captured as part of implementing an integrated interactive space, as discussed elsewhere herein. Step 802 ascertains that the individual is not facing the camera. For example, various eye tracking and/or body tracking techniques can be implemented to determine that the individual's eyes are not facing the camera. For instance, existing feature tracking technology can utilize three-dimensional video data received from a three-dimensional camera 106 and/or the NUI device 112 to determine various body poses for an individual, such as whether the individual is facing the camera.

Step 804 manipulates the image of the individual such that the individual appears to be facing the camera. As referenced above, various modeling and/or image extrapolation techniques can be implemented to manipulate the image of the individual such that the individual appears to be staring out of a display screen on which the image is displayed. For example, the image of the individual can be rotated and/or tilted on a display screen such that the individual appears to maintain virtual eye contact with another individual who is viewing the display screen. In implementations, portions of the image of the individual that are not provided via video data from the camera can be extrapolated from the camera video data and/or from a previously-captured image of the individual.

Figure 9:
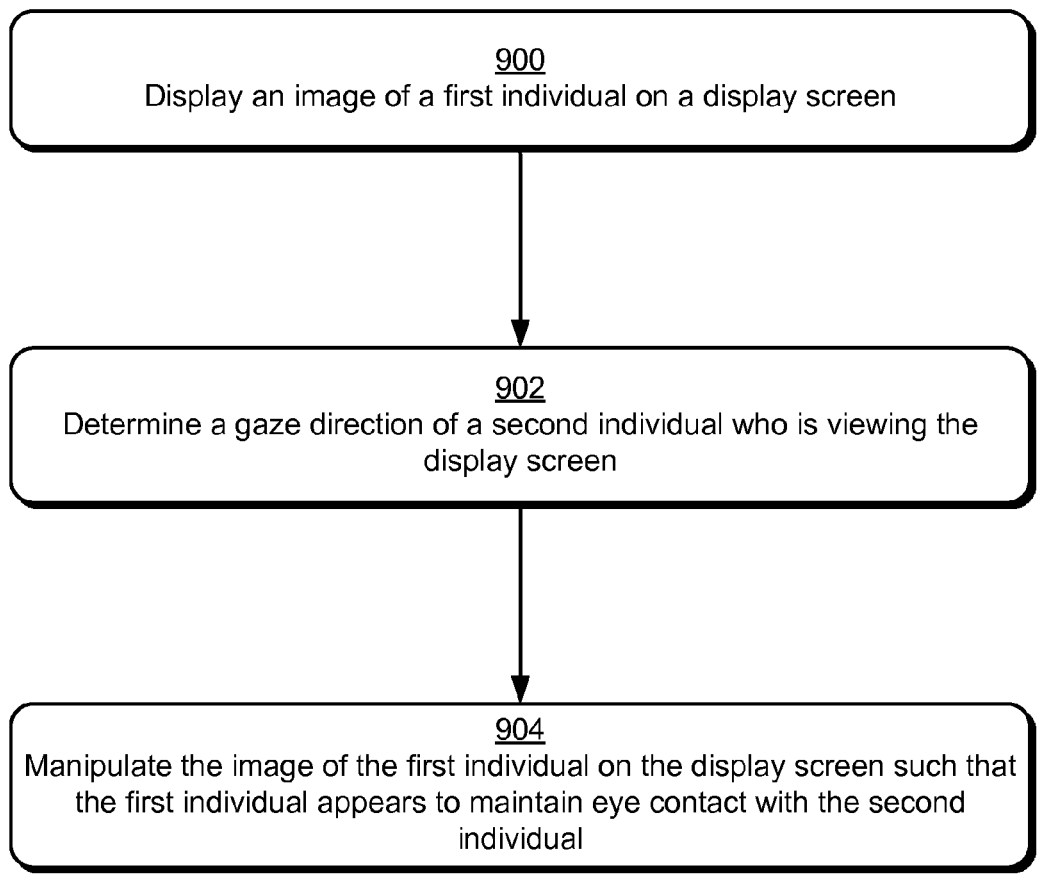
FIG. 9 is a flow diagram that describes steps in a method in accordance with one or more embodiments.

FIG. 9 is a flow diagram that describes steps in a method in accordance with one or more embodiments. Step 900 displays an image of a first individual on a display screen. Step 902 determines a gaze direction of a second individual who is viewing the display screen. For example, techniques discussed herein for eye tracking and/or determining body pose direction can be implemented to determine a gaze direction of the second individual with reference to the display screen.

Step 904 manipulates the image of the first individual on the display screen such that the first individual appears to maintain eye contact with the second individual. For example, the image of the first individual can be manipulated based on the gaze direction of the second individual. Example techniques for manipulating a displayed image to maintain simulated eye contact are discussed elsewhere herein.

Figure 10:
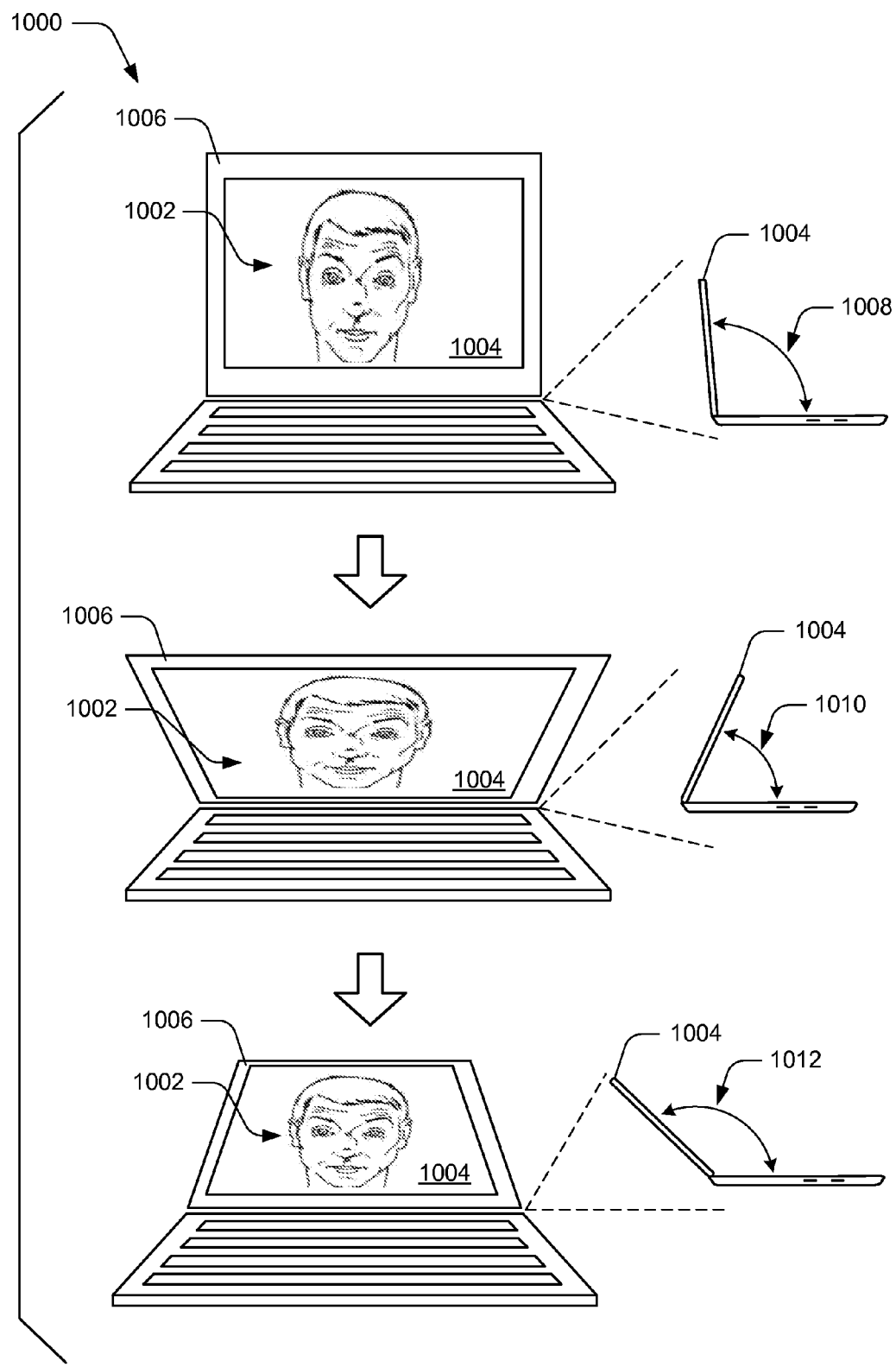
FIG. 10 illustrates an example implementation scenario in accordance with one or more embodiments.

FIG. 10 illustrates an example implementation scenario 1000 in which an image 1002 of an individual is adjusted based on a screen angle such that the individual appears to maintain eye contact with other individuals who are viewing the image 1002. In implementations, the image 1002 can correspond to a video image of an individual pursuant to an implementation of an integrated interactive space.

Starting with the upper portion of the scenario 1000, the image 1002 is displayed on a display screen 1004 of a device 1006, e.g., the computing device 102 discussed above. As illustrated in the right side of the upper portion, the display screen 1004 is oriented in the upper portion of the scenario 1000 to have a tilt angle 1008. In implementations, the tilt angle 1008 refers to an angle measured between the face of the display screen 1004 and the body of the device 1006. This particular way of determining a tilt angle is just one of many possible ways of determining a tilt angle within the spirit and scope of the claimed embodiments.

In this example, the tilt angle 1008 is within a threshold tilt angle range for the device 1006. In implementations, a threshold tilt angle range can be defined for a particular device. For example, a threshold tilt angle range for the device 1006 can be defined with respect to an angle measured between the face of the display screen 1004 and the body of the device 1006. As just one example threshold tilt angle range for the device 1006 can be between 70° to 120°.

Continuing to the center portion of the scenario 1000, the display screen 1004 is tilted forward on the device 1006 such that the display screen 1004 has a tilt angle 1010. In this example, the tilt angle 1010 exceeds the threshold tilt angle range for the device 1006. For example, the tilt angle 1010 can be 65°, which is outside of the example threshold tilt angle range discussed above. Since the tilt angle 1010 exceeds the threshold tilt angle range, the image 1002 is adjusted to compensate for the tilt angle 1010. For example, the image 1002 of the individual can be graphically manipulated such that the individual appears to be staring out of the display screen 1004 and maintaining eye contact with another individual who is viewing the display screen 1004.

Continuing to the bottom portion of the scenario 1000, the display screen 1004 is tilted backward on the device 1006 such that the display screen 1004 has a tilt angle 1012. In this example, the tilt angle 1012 exceeds the threshold tilt angle range for the device 1006. For example, the tilt angle 1010 can be 130°, which is outside of the example threshold tilt angle range discussed above. Since the tilt angle 1012 exceeds the threshold tilt angle range, the image 1002 is adjusted to compensate for the tilt angle 1012. For example, the image 1002 of the individual can be graphically manipulated such that the individual appears to be staring out of the display screen 1004 and maintaining eye contact with another individual who is viewing the display screen 1004.

While embodiments are illustrated with respect to tilting a display screen forward and back, this is not intended to be limiting. Techniques discussed herein can be employed to adjust a displayed image based on screen tilt in a variety of directions, such as forward and back, side to side, angular rotation, and combinations thereof.

Figure 11:
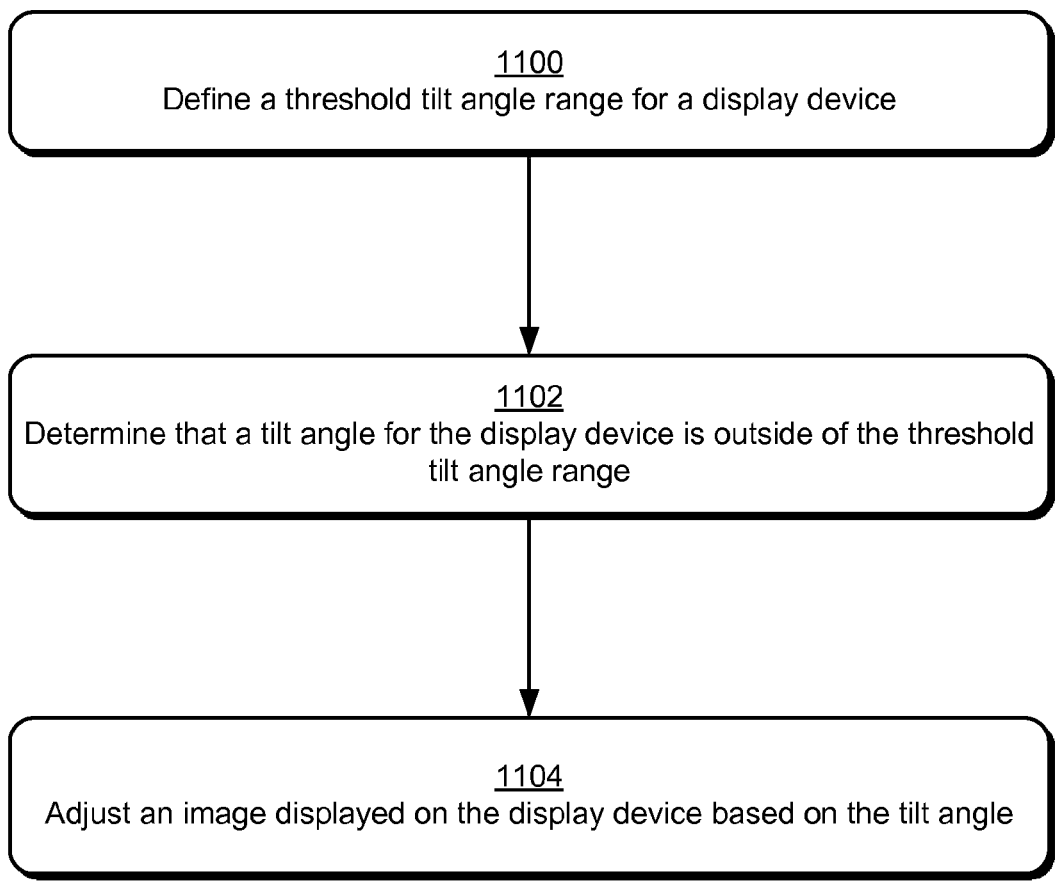
FIG. 11 is a flow diagram that describes steps in a method in accordance with one or more embodiments.

FIG. 11 is a flow diagram that describes steps in a method in accordance with one or more embodiments. Step 1100 defines a threshold tilt angle range for a display device. In implementations, the threshold tilt angle range can be defined with respect to an angle between a face of a display device and another object and/or surface. For example, as discussed above, a threshold tilt angle range for a laptop computer or other portable computing device can be defined with reference to the angle between a face of the laptop display screen and the body (e.g., keyboard) of the laptop computer. As another example, the threshold tilt angle range for a display screen can be defined with reference to an angle between a face of the display screen and a surface on which the display screen is placed, such as a desk, a conference table, and so on. As yet another example, the threshold tilt angle range for a display screen can be defined with reference to an angle of a device as determined using inertial measurements and/or sensors, magnetic sensors, and so on.

Step 1102 determines that a tilt angle for the display device is outside of the threshold tilt angle range. The tilt angle of the display device can be determined using a variety of techniques. For example, a laptop computer can include an angle measurement instrumentality that measures an angle between a face of the laptop display screen and the body of the laptop computer, such as in a hinge that attaches the display screen to the body. A variety of other techniques may be implemented to measure the tilt angle, such as infrared measuring device attached to the display device that reflects off of an adjacent surface and measures an angle between a face of the display device and the adjacent surface.

Step 1104 adjusts an image displayed on the display device based on the tilt angle. For example, a displayed image of an individual can be manipulated (e.g., tilted, rotated, skewed, and so on) such that the individual appears to maintain eye contact with another individual who is viewing the display device.

Virtual Shared Space

In implementations, techniques discussed herein can be employed to generate a virtual shared space in which multiple users can interact. A virtual shared space can provide a medium via which users in different locations can share information, and can further enable users in different locations to simultaneously interact with objects in the virtual shared space. To illustrate, consider the following implementation scenarios in accordance with one or more embodiments.

Figure 12:
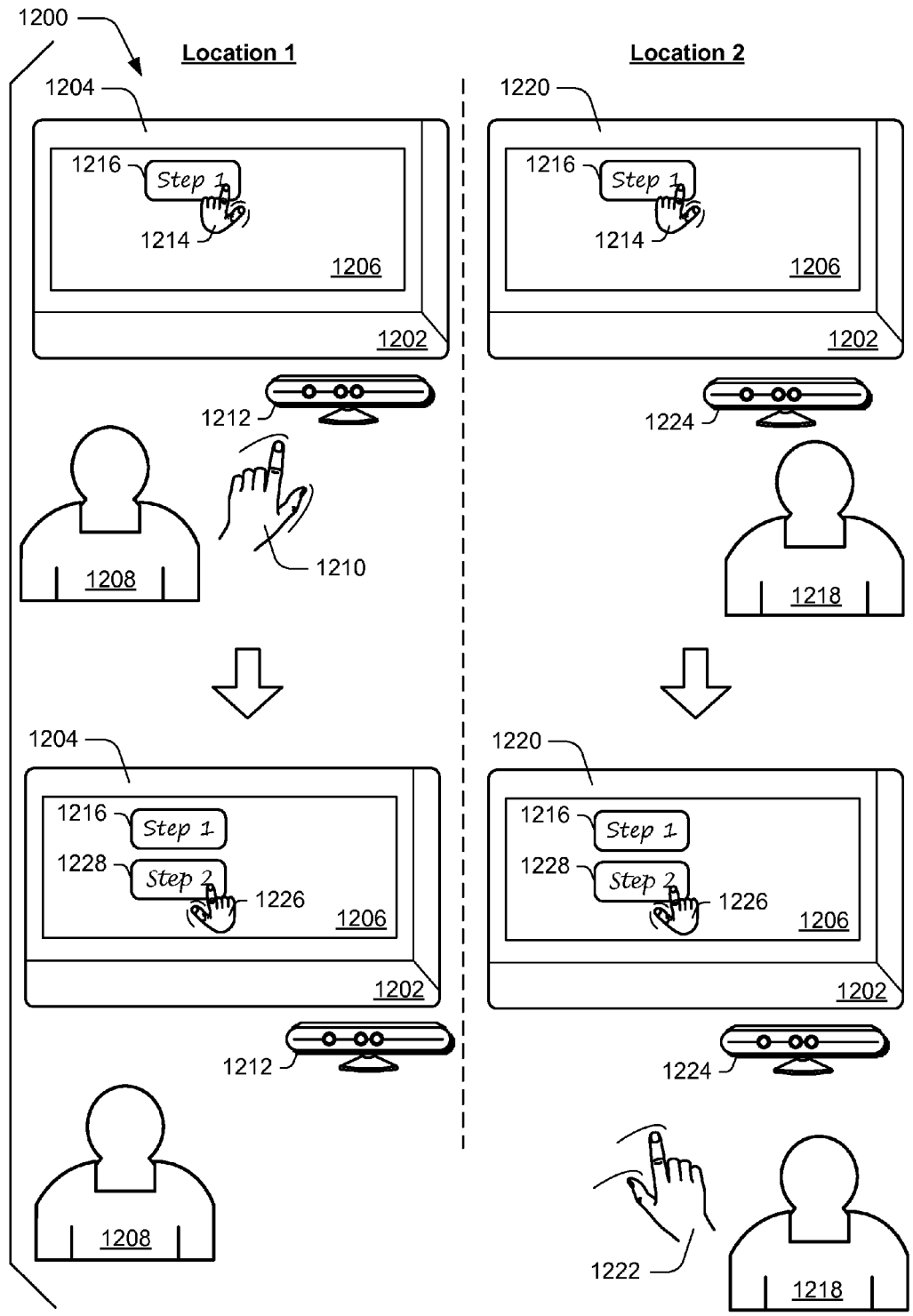
FIG. 12 illustrates an example implementation scenario in accordance with one or more embodiments.

FIG. 12 illustrates an example implementation scenario 1200 in which two users interact via a virtual shared space. Starting in the upper left of the scenario 1200, a virtual shared space 1202 is displayed on a display device 1204. In implementations, the virtual shared space 1202 is a visual representation of a three-dimensional environment. The virtual shared space 1202 can be generated using images captured via a video camera, using computer-based animation, computer-generated graphics, combinations thereof, and so on. In implementations, the virtual shared space 1202 can enable visual interaction, audio interaction, text-based interaction, and so on.

Displayed as part of the virtual shared space 1202 is a virtual whiteboard 1206. The virtual whiteboard 1206 is representative of functionality to enable users to provide and view graphical input. For example, a user can provide input to the virtual whiteboard 1206 using a variety of different types of input, such as touch-based input, voice-recognition-based input, gesture-based input, and so on.

Further to the scenario 1200, a user 1208 at a first location (e.g., "Location 1") provides input to the virtual whiteboard 1206 by making gestures with the user's hand 1210. The gestures are recognized by an NUI device 1212, which provides data to an associated computing device indicating user input to the virtual whiteboard 1206. In this example, the user input includes a manipulation of an icon 1214 to draw an object 1216 on the virtual whiteboard 1206. In implementations, various computer drawing and/or graphical manipulation techniques can be employed to provide input to the virtual whiteboard 1206.

Proceeding to the upper right of the scenario 1200, a user 1218 at a different location (e.g., "Location 2") views the virtual shared space 1202 as displayed on a display device 1220. In implementations, the Location 2 can be a room or other facility at a different geographic location than the Location 1. While viewing the virtual shared space 1202, the user 1218 views the input provided by the user 1208 to the virtual whiteboard 1206, e.g., the drawing of the object 1216. For instance, the user 1218 can view the object 1216 as it is being drawn by the user 1208, e.g., simultaneously as the user 1208 is providing the input.

Continuing to the lower right portion of the scenario 1200, the user 1218 provides input to the virtual whiteboard 1206 by making gestures with the user's hand 1222. The gestures are recognized by an NUI device 1224, which provides data to an associated computing device indicating user input to the virtual whiteboard 1206. In this example, the user input includes a manipulation of an icon 1226 to draw an object 1228 on the virtual whiteboard 1206.

Proceeding to the lower left portion of the scenario 1200, the user 1208 views the input provided by the user 1218 to the virtual whiteboard 1206, e.g., the drawing of the object 1228. For instance, the user 1208 can view the object 1228 as it is being drawn by the user 1218, e.g., simultaneously as the user 1218 is providing the input.

Figure 13:
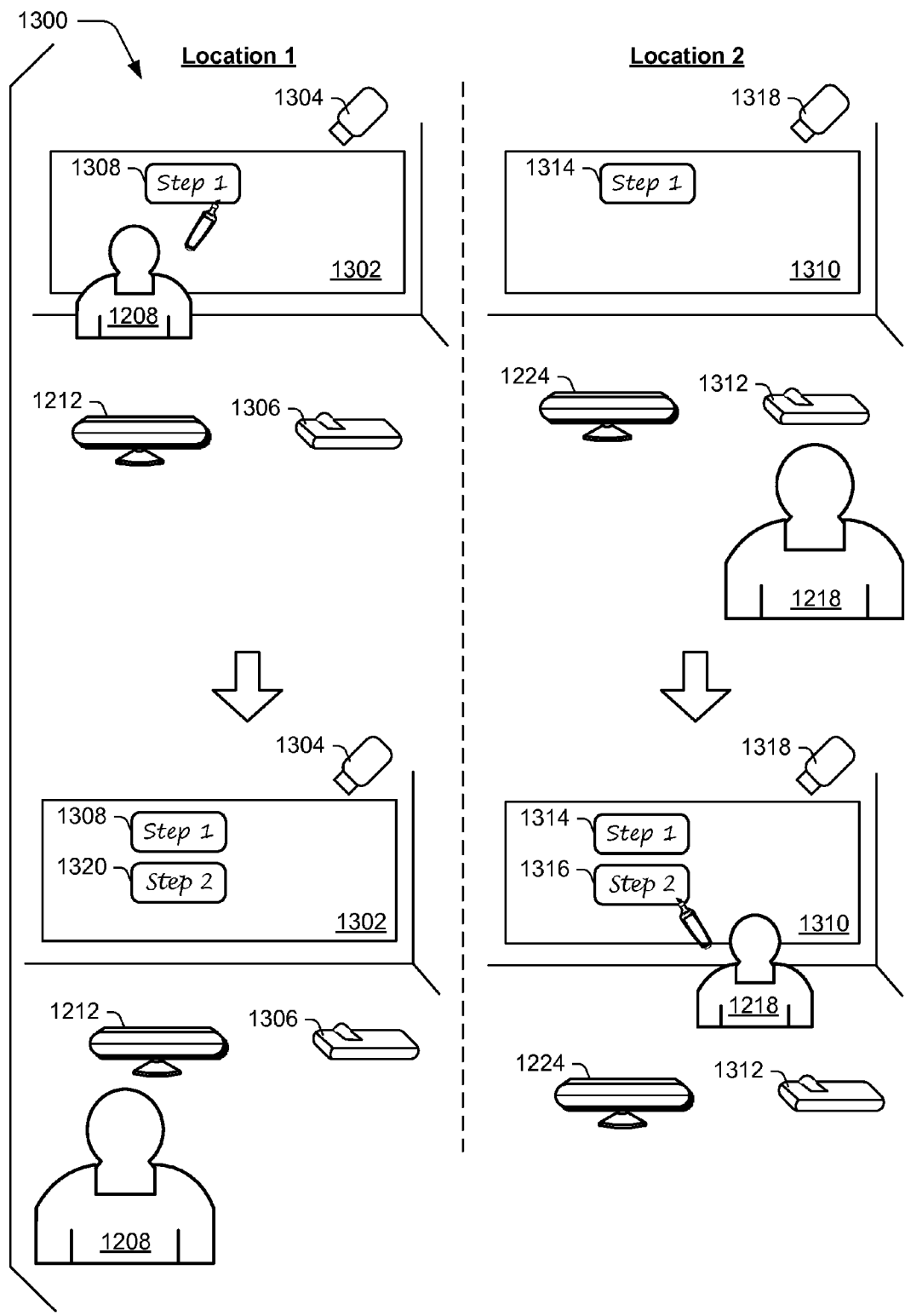
FIG. 13 illustrates an example implementation scenario in accordance with one or more embodiments.

FIG. 13 illustrates an example implementation scenario 1300 in which two users interact via a shared surface included as part of a virtual shared space. Starting in the upper left of the scenario 1300, a shared surface 1302 is positioned at a first location, e.g., "Location 1." The shared surface 1302 can be embodied as any suitable surface with which a user may interact, such as a whiteboard, a chalk board, a painted wall, a display screen that accepts user input (e.g., touch input and/or touchless gesture-based input), and so on. Also positioned at the first location are the NUI device 1212, a camera 1304, and a projector 1306, such as a video projector.

Further to the scenario 1300, the user 1208 interacts with the shared surface 1302 by drawing an object 1308 on the shared surface. For example, in a whiteboard scenario, the user 1208 can use a marker to draw the object 1308 on the shared surface 1302. The camera 1304 captures the user interaction with the shared surface 1302, such as the object 1308 being drawn on the shared surface. Additionally, the NUI device 1212 can capture various information about the interaction by the user 1208 with the shared surface 1302, such as a relative location of the user 1208 in the first location, one or more gestures made by the user 1208, and so on.

Continuing to the upper right portion of the scenario 1300, the interaction by the user 1208 with the shared surface 1302 is displayed on a shared surface 1310 that is positioned at a second location, e.g., "Location 2." For example, the video data captured by the camera 1304 can be communicated, directly or indirectly, to a projector 1312 that is positioned at the second location. The projector 1312 can project the video data onto the shared surface 1310 as a virtual object 1314. For example, the virtual object 1314 can correspond to a digital image of the object 1308 that is displayed on the shared surface 1310. In implementations, the projector 1312 can project the interaction by the user 1208 with the shared surface 1302 as the interaction occurs, e.g., simultaneously. Thus, the user 1218 at the second location can view, via the shared surface 1310, the interaction by the user 1208 with the shared surface 1302 as the interaction occurs.

Continuing to the lower right portion of the scenario 1300, the user 1218 interacts with the shared surface 1310 by drawing an object 1316 on the shared surface 1310. For example, the user 1218 can draw the object 1316 adjacent to the displayed virtual object 1314. A camera 1318 captures the user interaction with the shared surface 1310, such as the object 1316 being drawn on the shared surface. Additionally, the NUI device 1224 can capture various information about the interaction by the user 1218 with the shared surface 1310, such as a relative location of the user 1218 in the second location, one or more gestures made by the user 1218, and so on.

Continuing to the lower left portion of the scenario 1300, the interaction by the user 1218 with the shared surface 1310 is displayed on the shared surface 1302 at the first location. For example, video data captured by the camera 1318 can be communicated to the projector 1306, which can display the video data as a virtual object 1320. For instance, the virtual object 1320 can correspond to a digital image of the object 1316 that is displayed on the shared surface 1302. In implementations, the projector 1306 can project the interaction by the user 1218 with the shared surface 1310 as the interaction occurs, e.g., simultaneously. Thus, the user 1208 at the first location can view, via the shared surface 1302, the interaction by the user 1218 with the shared surface 1310 as the interaction occurs.

As illustrated, the shared surfaces 1302, 1310 provide an interactive space with which a user can physically interact, such as by drawing objects, placing objects, providing digital input, and so on. Such physical interaction with the shared surface can be captured and displayed at another shared surface, such as by projecting video data onto the other shared surface. Additionally or alternatively, user interaction with a shared surface can be presented via a worn device, such as video display glasses, a virtual reality helmet, and so on.

Further to such embodiments, the cameras at the different locations (e.g., Location 1 and Location 2) can be synchronized, such as using camera synchronization techniques discussed herein. This can enable the position of the user relative to a shared surface to be tracked and can enable a user interaction with one shared surface to be accurately displayed at a corresponding location on another shared surface. For example, with reference to the scenario 1300, the camera 1304 can be synchronized with the camera 1318 such that the shared surface 1302 and the shared surface 1310 form an integrated shared surface. This can enable a user interaction with one shared surface to be displayed at an appropriate position and/or location on another shared surface.

Figure 14:
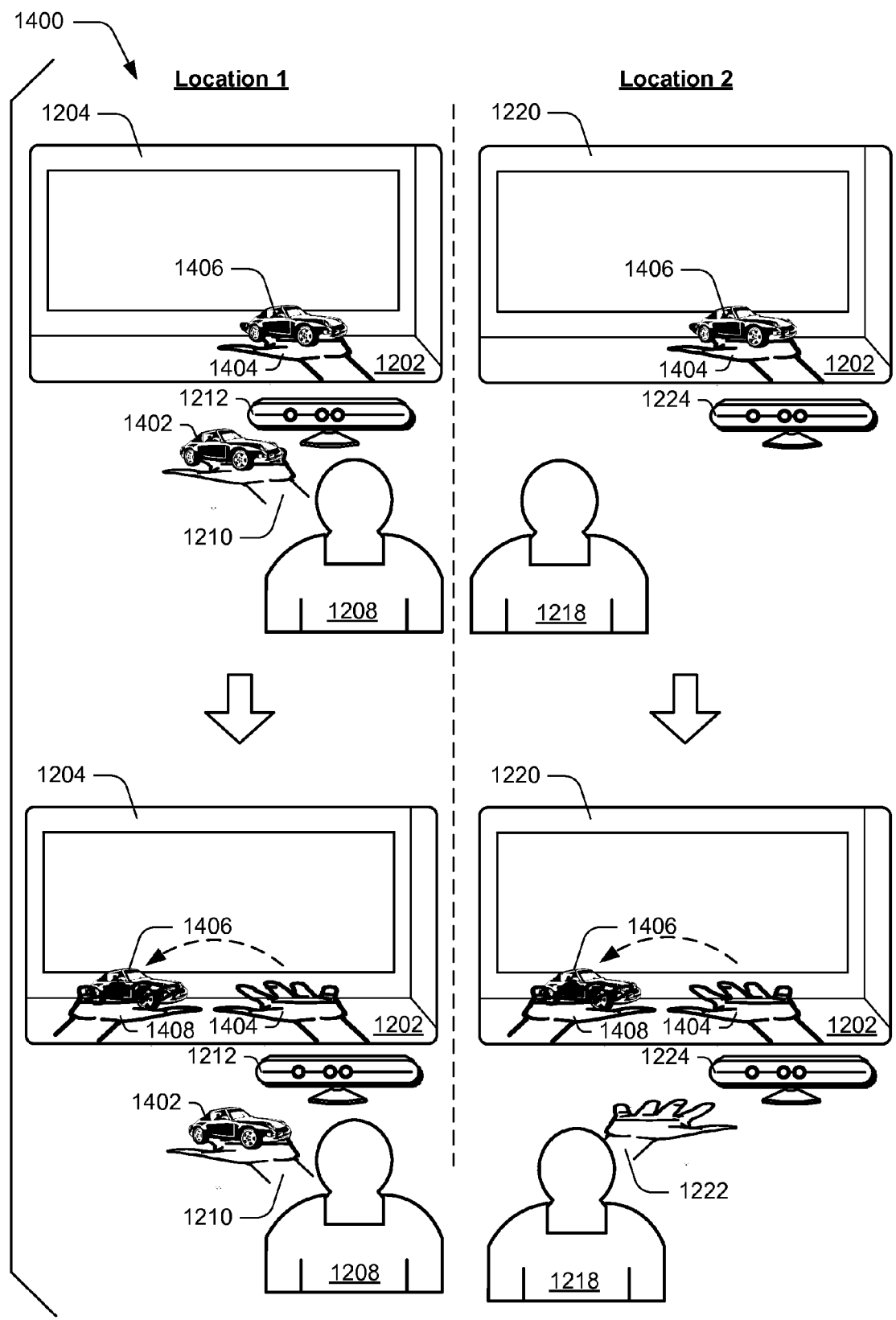
FIG. 14 illustrates an example implementation scenario in accordance with one or more embodiments.

FIG. 14 illustrates an example implementation scenario 1400 in which two users interact via a virtual shared space. The scenario 1400 represents additional types of user interactions with the virtual shared space 1202, discussed above with reference to scenario 1200. In embodiments, the scenario 1400 can be implemented via a virtual shared space that is displayed on a shared surface, examples of which are discussed above.

Beginning with the upper left portion of the scenario 1400, the user 1208 is holding a physical object 1402 in the user's hand 1210. In this example, the physical object 1402 is a model car. In implementations, however, any suitable physical object may be utilized. The user 1208 extends the user's hand 1210 holding the physical object 1402 towards the NUI device 1212.

The NUI device 1212 detects the extension of the hand 1210, and in response causes a virtual hand 1404 to be displayed as part of the virtual shared space 1202. For example, the NUI device 1212 can communicate information to a computing device indicating the extension of the hand 1210 towards the virtual shared space 1202. Based on this information, the computing device can cause the virtual hand 1404 be displayed on the display device 1204. In implementations, the virtual hand 1404 is a graphical rendering of the hand 1210 and can be manipulated within the virtual shared space 1202 based on movements of the hand 1210. For example, if the user 1208 moves the hand 1210 in various directions as detected by the NUI device 1212, the virtual hand 1404 can be moved in corresponding directions within the virtual shared space 1202.

Further to the scenario 1400, a virtual object 1406 is displayed in the virtual hand 1404 in response to the user 1208 extending the hand 1210 with the physical object 1402 towards the NUI device 1212. The virtual object 1406 corresponds to a graphical rendering of a three-dimensional object in the virtual shared space 1202, such as an image of the physical object 1402 that is scanned by an optical scanning device.

According to embodiments, the virtual object 1406 can correspond to a virtual version of the physical object 1402, and can be displayed in response to recognition of a manipulation of the physical object 1402. For example, the NUI device 1212 and/or other instrumentality can recognize the physical object 1402 using one or more recognition techniques. For instance, the physical object 1402 can include an RFID tag which is recognized by an RFID sensor. As another example, the NUI device 1212 can leverage the camera 106 to recognize the physical object 1402 based on physical attributes of the physical object 1402 that are scanned and/or recognized by the NUI device 1212.

In implementations, the virtual object 1406 can be positionally associated with the virtual hand 1404 such that movement of the virtual hand 1404 can cause the virtual object 1406 to be correspondingly manipulated within the virtual shared space 1202.

Continuing to the upper right portion of the scenario 1400, the user 1218 views the interaction by the user 1208 with the virtual shared space 1202. As discussed above, the user 1218 is in a different location than the user 1208, and shares a common view of the virtual shared space 1202 with the user 1208. Thus, the user 1218 can view interactions by the user 1208 with the virtual shared space 1202 as the interactions occur. For example, the user 1218 can view the extension of the virtual hand 1404 with the virtual object 1406 into the virtual shared space 1202 as the user 1208 extends the hand 1210 with the physical object 1402 towards the NUI device 1212.

Proceeding to the lower right portion of the scenario 1400, the user 1218 extends the user's hand 1222 toward the NUI device 1224. The NUI device 1224 detects the extension of the hand 1222 towards the NUI device 1224, and in response causes a virtual hand 1408 to be displayed as part of the virtual shared space 1202. In implementations, the virtual hand 1408 is a graphical rendering of the hand 1222 and can be manipulated with in the virtual shared space 1202 based on movements of the hand 1222. For example, if the user 1218 moves the hand 1222 in various directions as detected by the NUI device 1224, the virtual hand 1408 can be moved in corresponding directions within the virtual shared space 1202.

Continuing with the scenario 1400, the user 1218 manipulates the virtual hand 1408 towards the virtual hand 1404 such that the virtual object 1406 is transferred to the virtual hand 1408. For example, the user 1208 can "hand" the virtual object 1406 to the virtual hand 1408 via gesture-based manipulation of the virtual hand 1404. Alternatively or additionally, the user 1218 can grasp the virtual object 1406 from the virtual hand 1404 via gesture-based manipulation of the virtual hand 1408.

As illustrated in the lower left portion of the scenario 1400, the user 1208 views the movement of the virtual object 1406 from the virtual hand 1404 to the virtual hand 1408 as the movement occurs. For example, the transfer of the virtual object 1406 between the virtual hands can be viewed simultaneously by the user 1208 and the user 1218.

In implementations, the virtual object 1406 can be manipulated (e.g., using a virtual hand) in a variety of ways within the virtual shared space 1202. For example, the virtual object 1406 can be rotated, resized, disassembled, reassembled, graphically augmented, and so on.

While embodiments are discussed herein with reference to users at different locations interacting with a virtual shared space, embodiments may additionally or alternatively be employed to enable users at a single location to interact with a virtual shared space. For example, the virtual shared space 1202 discussed above can be displayed on a display surface at a particular location. For example, the virtual shared space 1202 can be displayed on a single display device, an integrated combination of display devices, a projection screen, a wall, and so on. Multiple users at the particular location can interact with the virtual shared space 1202, such as via one or more of the example interactions discussed above. Thus, the virtual shared space 1202 can provide a common view of an interactive space which can be employed to enable users to interact.

Figure 15:
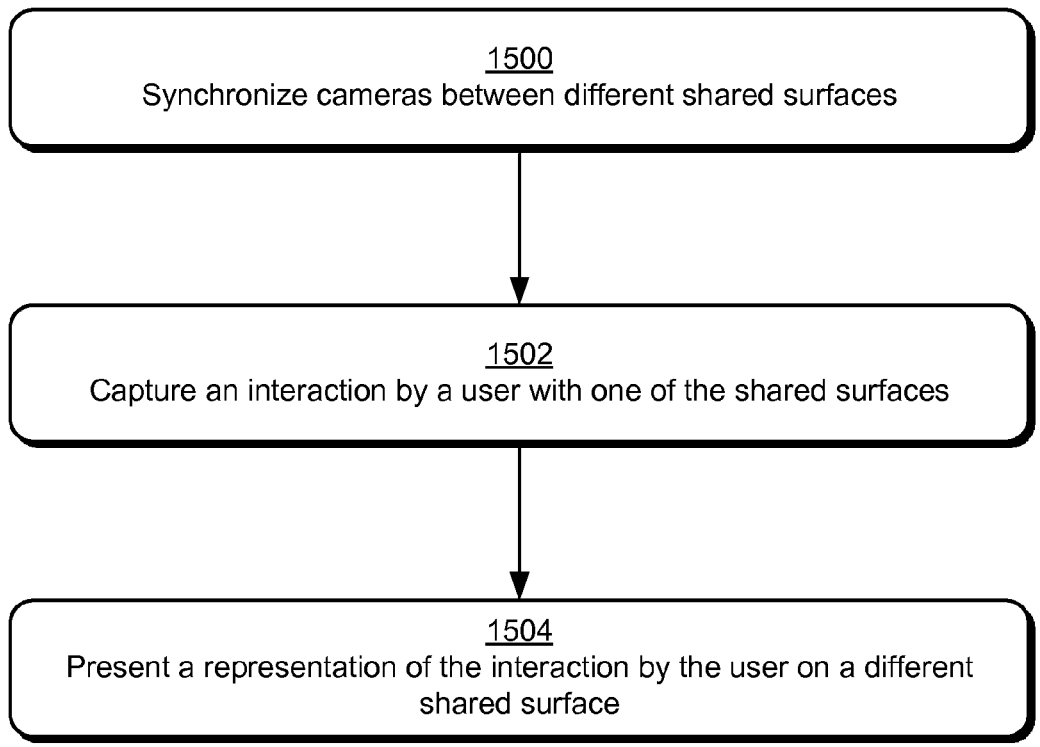
FIG. 15 is a flow diagram that describes steps in a method in accordance with one or more embodiments.

FIG. 15 is a flow diagram that describes steps in a method in accordance with one or more embodiments. Step 1500 synchronizes cameras between different shared surfaces. For example, with reference to the scenario 1300 discussed above, the camera 1304 can be synchronized with the camera 1318.

Step 1502 captures an interaction by a user with one of the shared surfaces. For example, the interaction can be a physical interaction, such as drawing on the shared surface, placing an object on the shared surface, and so on. Step 1504 presents a representation of the interaction by the user on a different shared surface. For example, the interaction can be captured by a camera, which can communicate video data of the interaction for display on another shared surface.

Figure 16:
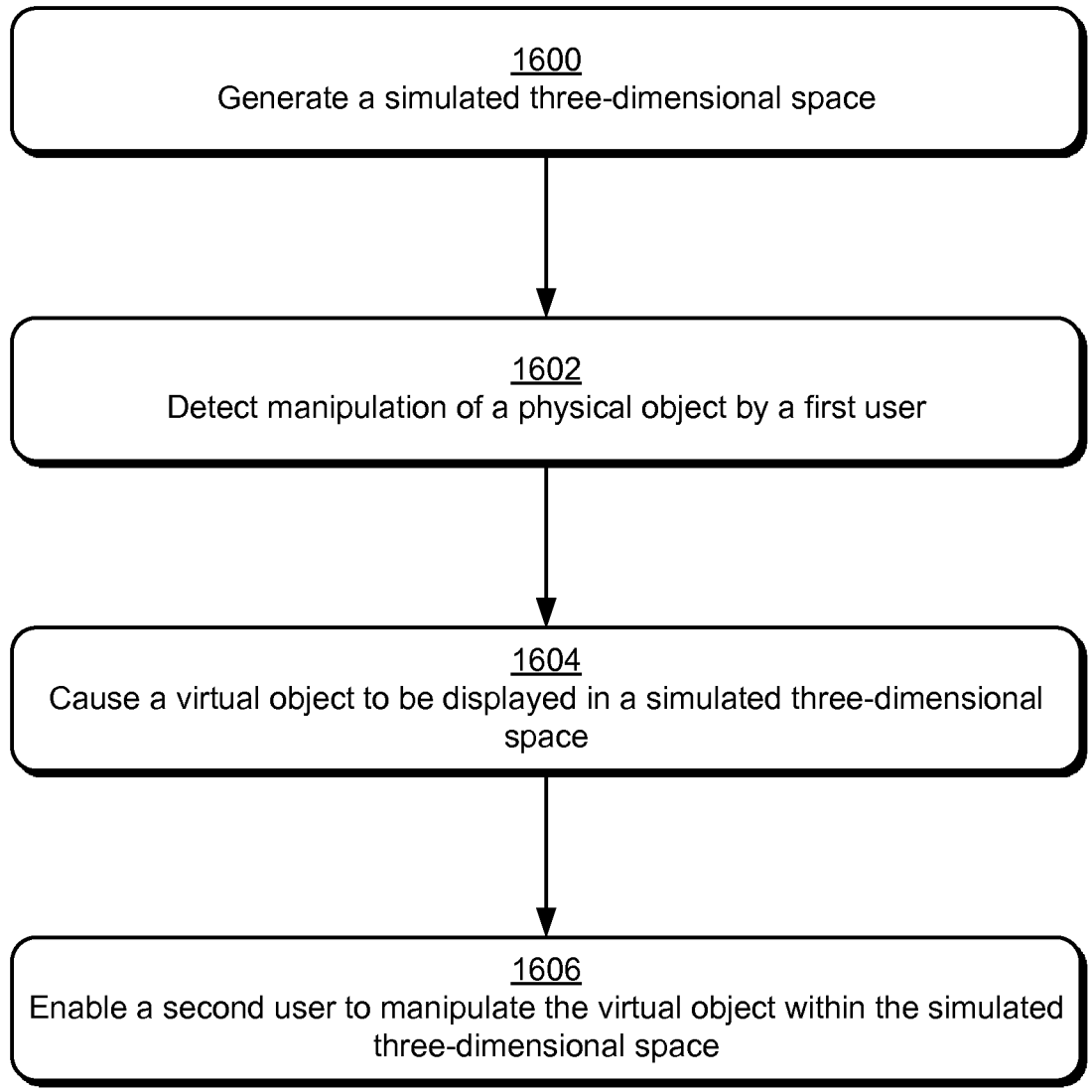
FIG. 16 is a flow diagram that describes steps in a method in accordance with one or more embodiments.

FIG. 16 is a flow diagram that describes steps in a method in accordance with one or more embodiments. Step 1600 generates a simulated three-dimensional space. For example, a graphical simulation of a physical three-dimensional environment can be generated and displayed, such as by the visualization module 116. Examples of the simulated three-dimensional space include the integrated interactive spaces and the virtual shared spaces discussed above.

Step 1602 detects manipulation of a physical object by a first user. User manipulation of the physical object can be recognized using a variety of different recognition techniques, examples of which are discussed above. For example, the NUI device 112 can recognize a physical object being manipulated by the first user.

Step 1604 causes a virtual object to be displayed in a simulated three-dimensional space. For example, a virtual object that corresponds to the physical object can be placed in the three-dimensional space in response to detecting the manipulation of the physical object by the first user. Step 1606 enables a second user to manipulate the virtual object within the simulated three-dimensional space. For example, the second user can receive the virtual object from the first user and can manipulate the virtual object within the simulated three-dimensional space in various ways, examples of which are discussed above.

In implementations, techniques discussed herein can enable the first user and the second user to manipulate the virtual object within the simulated three-dimensional space. For example, during an interactive session the first user and the second user can manipulate the virtual object simultaneously and/or can hand the virtual object to one another in the simulated three-dimensional space. Further, embodiments can enable more than two users to interact (e.g., manipulate an object) within a simulated three-dimensional space.

Example System and Device

Figure 17:
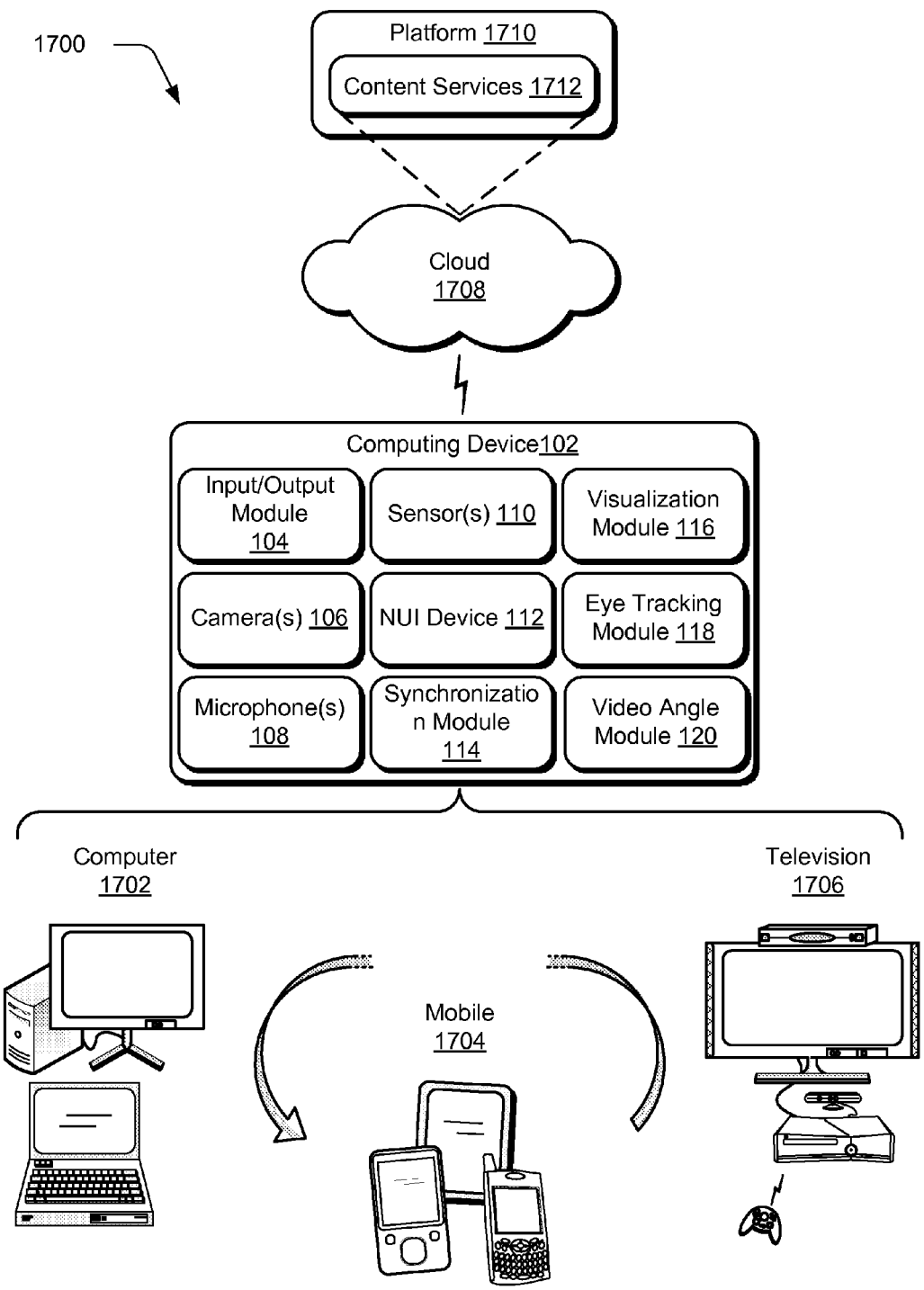
FIG. 17 illustrates an example system that includes the computing device as described with reference to FIGS. 1 and 18.

FIG. 17 illustrates an example system 1700 that includes the computing device 102 as described with reference to FIGS. 1 and 18. The example system 1700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1700, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link. In one or more embodiments, this interconnection architecture enables functionality to be delivered across multiple devices to provide a common and seamless experience to a user of the multiple devices. Each of the multiple devices may have different physical attributes and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 102 may assume a variety of different configurations, such as for computer 1702, mobile 1704, and television 1706 uses. Each of these configurations includes devices that may have generally different constructs and capabilities, and thus the computing device 102 may be configured according to one or more of the different device classes. For instance, the computing device 102 may be implemented as the computer 1702 class of a device that includes a personal computer, desktop computer, a multi-screen computer, laptop computer, netbook, and so on.

The computing device 102 may also be implemented as the mobile 1704 class of device that includes mobile devices, such as a mobile phone, portable music player, portable gaming device, a tablet computer, a multi-screen computer, and so on. The computing device 102 may also be implemented as the television 1706 class of device that includes devices having or connected to generally larger screens in casual viewing environments. These devices include televisions, set-top boxes, gaming consoles, and so on. The techniques described herein may be supported by these various configurations of the computing device 102 and are not limited to the specific examples the techniques described herein.

The cloud 1708 includes and/or is representative of a platform 1710 for content services 1712. The platform 1710 abstracts underlying functionality of hardware (e.g., servers) and software resources of the cloud 1708. The content services 1712 may include applications and/or data that can be utilized while computer processing is executed on servers that are remote from the computing device 102. Content services 1712 can be provided as a service over the Internet and/or through a subscriber network, such as a cellular or Wi-Fi network.

The platform 1710 may abstract resources and functions to connect the computing device 102 with other computing devices. The platform 1710 may also serve to abstract scaling of resources to provide a corresponding level of scale to encountered demand for the content services 1712 that are implemented via the platform 1710. Accordingly, in an interconnected device embodiment, implementation of functionality described herein may be distributed throughout the system 1700. For example, the functionality may be implemented in part on the computing device 102 as well as via the platform 1710 that abstracts the functionality of the cloud 1708, as shown through inclusion of the various functionalities of the computing device 102.

Figure 18:
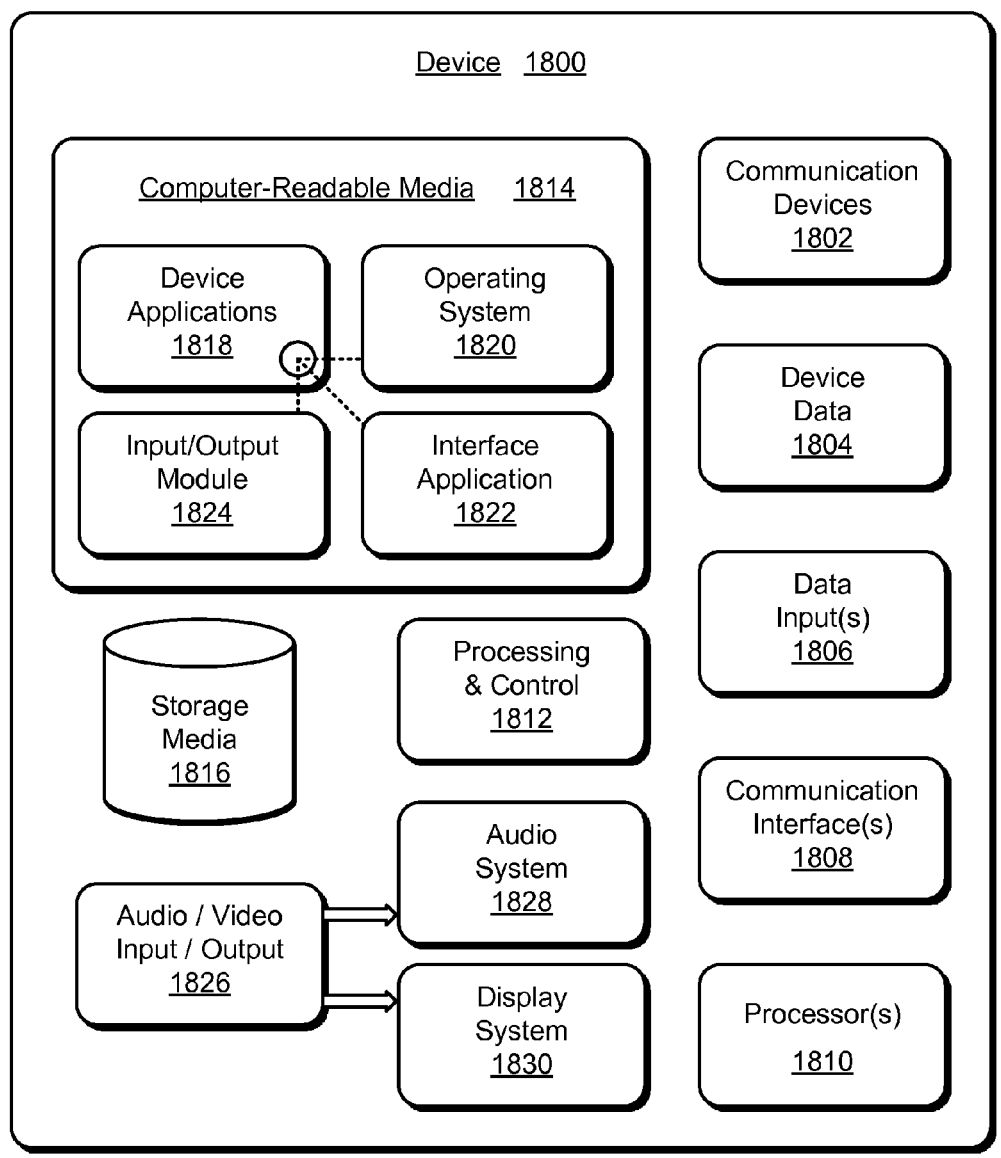
FIG. 18 illustrates various components of an example device that can be implemented as any type of portable and/or computer device as described with reference to FIGS. 1 and 17 to implement embodiments of techniques described herein.

FIG. 18 illustrates various components of an example device 1800 that can be implemented as any type of device 102 as described with reference to FIG. 1 to implement embodiments of the techniques described herein. Device 1800 includes communication devices 1802 that enable wired and/or wireless communication of device data 1804 (e.g., received data, data that is being received, data scheduled for broadcast, data packets of the data, etc.).

The device data 1804 or other device content can include configuration settings of the device, media content stored on the device, and/or information associated with a user of the device. Media content stored on device 1800 can include any type of audio, video, and/or image data. Device 1800 includes one or more data inputs 1806 via which any type of data, media content, and/or inputs can be received, such as user-selectable inputs, messages, music, television media content, recorded video content, and any other type of audio, video, and/or image data received from any content and/or data source.

Device 1800 also includes communication interfaces 1808 that can be implemented as any one or more of a serial and/or parallel interface, a wireless interface, any type of network interface, a modem, and as any other type of communication interface. The communication interfaces 1808 provide a connection and/or communication link between device 1800 and a communication network by which other electronic, computing, and communication devices communicate data with device 1800.

Device 1800 includes one or more processors 1810 (e.g., any of microprocessors, controllers, and the like) which process various computer-executable instructions to control the operation of device 1800 and to implement embodiments of the techniques described herein. Alternatively or in addition, device 1800 can be implemented with any one or combination of hardware, firmware, or fixed logic circuitry that is implemented in connection with processing and control circuits which are generally identified at 1812. Although not shown, device 1800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1800 also includes computer-readable media 1814, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1800 can also include a mass storage media device 1816.

Computer-readable media 1814 provides data storage mechanisms to store the device data 1804, as well as various device applications 1818 and any other types of information and/or data related to operational aspects of device 1800. For example, an operating system 1820 can be maintained as a computer application with the computer-readable media 1814 and executed on processors 1810. The device applications 1818 can include a device manager (e.g., a control application, software application, signal processing and control module, code that is native to a particular device, a hardware abstraction layer for a particular device, etc.). The device applications 1818 also include system components or modules to implement embodiments of the techniques described herein.

In this example, the device applications 1818 include an interface application 1822 and an input/output module 1824 that are shown as software modules and/or computer applications. The input/output module 1824 is representative of software that is used to provide an interface with a device configured to capture inputs, such as a touchscreen, track pad, camera, microphone, and so on. Alternatively or in addition, the interface application 1822 and the input/output module 1824 can be implemented as hardware, software, firmware, or any combination thereof. Additionally, the input/output module 1824 may be configured to support multiple input devices, such as separate devices to capture visual and audio inputs, respectively.

Device 1800 also includes an audio and/or video input-output system 1826 that provides audio data to an audio system 1828 and/or provides video data to a display system 1830. The audio system 1828 and/or the display system 1830 can include any devices that process, display, and/or otherwise render audio, video, and image data. Video signals and audio signals can be communicated from device 1800 to an audio device and/or to a display device via an RF (radio frequency) link, S-video link, composite video link, component video link, DVI (digital video interface), analog audio connection, or other similar communication link. In an embodiment, the audio system 1828 and/or the display system 1830 are implemented as external components to device 1800. Alternatively, the audio system 1828 and/or the display system 1830 are implemented as integrated components of example device 1800.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processor (e.g., CPU or CPUs). The program code can be stored in one or more computer readable memory devices. The features of the techniques described below are platform-independent, meaning that the techniques may be implemented on a variety of commercial computing platforms having a variety of processors.

CONCLUSION

Techniques for implementing an integrated interactive space are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. A computer-implemented method comprising:
    synchronizing a first camera in a first physical environment and a second camera in a second physical environment to generate a simulated three-dimensional shared space shared between a first user in the first physical environment and a second user in the second physical environment;
    capturing via the first camera an interaction by the first user with a physical object in the first physical environment to create a drawing in the first physical environment; and
    presenting a virtual object representation of the physical object and a representation of the interaction with the physical object in the simulated three-dimensional shared space.

2. A computer-implemented method as described in claim 1, further comprising capturing via the second camera an interaction by the second user with the virtual object in the simulated three-dimensional shared space.

3. A computer-implemented method as described in claim 1, further comprising enabling the first user and the second user to hand the virtual object to one another within the simulated three-dimensional shared space and during a single interactive session.

4. A computer-implemented method as described in claim 1, further comprising enabling the second user to rotate, resize, disassemble, reassemble, or augment the virtual object or the drawing.

5. A computer-implemented method as described in claim 1, wherein the virtual object is a three-dimensional graphical rendering that corresponds to the physical object.

6. A computer-implemented method as described in claim 1, wherein the virtual object is an image of the physical object captured by an optical scanning device.

7. A computer-implemented method as described in claim 1, wherein presenting the representation of the interaction with the physical object comprises presenting a graphical representation of a hand of the first user used in the interaction with the physical object.

8. A system comprising:
one or more computer-readable storage media storing executable instructions; and
one or more processors configured to execute instructions to cause the system to perform operations comprising:
receiving data captured via a first camera, the data captured by the first camera describing an interaction by a first user with a physical object in a first physical environment;
synchronizing the data received from the first camera in the first physical environment and data received from a second camera in a second physical environment to generate a simulated three-dimensional shared space shared between the first user in the first physical environment and a second user in the second physical environment;
generating a virtual object representation of the physical object and a representation of the interaction with the physical object in the simulated three-dimensional shared space; and
receiving subsequent data captured via the second camera, the subsequent data captured by the second camera describing a subsequent interaction by the second user with the virtual object in the simulated three-dimensional shared space, the subsequent interaction by the second user comprising drawing in the simulated three-dimensional shared space.

9. A system as described in claim 8, the operations further comprising receiving subsequent data captured via the second camera, the data captured by the second camera describing an interaction by the second user with the virtual object in the simulated three-dimensional shared space.

10. A system as described in claim 8, the operations further comprising enabling the first user and the second user to hand the virtual object to one another within the simulated three-dimensional shared space and during a single interactive session.

11. A system as described in claim 8, the operations further comprising enabling the second user to rotate, resize, disassemble, reassemble, or augment the virtual object.

12. A system as described in claim 8, wherein the virtual object is a three-dimensional graphical rendering that corresponds to the physical object.

13. A system as described in claim 8, wherein generating the representation of the interaction with the physical object comprises generating a graphical representation of a hand of the first user that was used in the interaction with the physical object in the first environment.

14. A system comprising:
a first camera in a first physical environment;
a second camera in a second physical environment;
a memory and processor system configured to execute a synchronization module implemented to synchronize the first camera in the first physical environment and the second camera in the second physical environment to generate a simulated three-dimensional shared space shared between a first user in the first physical environment and a second user in the second physical environment;
the first camera configured to capture an interaction by the first user with a physical object in the first physical environment to create a drawing in the first physical environment; and
the memory and processor system configured to execute a visualization module implemented to present a virtual object representation of the physical object and a representation of the interaction with the physical object in the simulated three-dimensional shared space.

15. A system as described in claim 14, wherein the first physical environment includes one of a whiteboard, a chalkboard, a painted wall, or a display screen that accepts user input.

16. A system as described in claim 14, further comprising:
the second camera configured to capture an interaction by the second user with the drawing created by the first user; and
wherein the visualization module is implemented to present a virtual representation of the interaction by the second user in the simulated three-dimensional shared space.

17. A system as described in claim 14, wherein the visualization module is implemented to present a virtual representation of the first user performing the interaction.

18. A system as described in claim 14, further comprising:
the second camera configured to capture an interaction by the second user in the second physical environment; and
wherein the visualization module is implemented to present a virtual representation of the interaction by the second user in the simulated three-dimensional shared space.

19. A system as described in claim 14, wherein the visualization module is implemented to present simultaneously while the first camera is configured to capture.

20. A system as described in claim 14, wherein the representation of the interaction with the physical object comprises a graphical representation of a hand of the first user that was used in the interaction with the physical object in the first physical environment.

* * * * *